United States Patent
Pedersen

[15] 3,687,978
[45] Aug. 29, 1972

[54] MACROCYCLIC POLYETHER COMPOUNDS

[72] Inventor: Charles John Pedersen, Salem, N.J.

[73] Assignee: E. I. du Pont de Nemours and Company, 2, Wilmington, Del.

[22] Filed: Aug. 6, 1969

[21] Appl. No.: 848,111

Related U.S. Application Data

[63] Continuation-in-part of Ser. No. 588,302, Oct. 21, 1966, abandoned, which is a continuation-in-part of Ser. No. 358,937, April 10, 1964, abandoned.

[52] U.S. Cl. ............... 260/340.3, 260/41, 260/79.5, 260/80.76, 260/80.77, 260/87.7, 260/92.1, 260/152, 260/338, 260/340.3, 260/827
[51] Int. Cl. .............................................. C07d 15/00
[58] Field of Search ................................... 260/340.3

[56] References Cited

UNITED STATES PATENTS

| | | | |
|---|---|---|---|
| 3,546,318 | 12/1970 | Vest | 260/340.3 X |
| 3,580,889 | 5/1971 | Barney et al. | 260/340.3 X |

*Primary Examiner*—Alex Mazel
*Assistant Examiner*—James H. Turnipseed
*Attorney*—Raymond E. Blomstedt

[57] ABSTRACT

Macrocyclic polyether ("crown") compounds wherein the macrocyclic ring contains at least 14 carbon and oxygen atoms, each oxygen in the ring being separated from adjoining oxygens in the ring by two or three carbons; and the macrocyclic ring being fused to 1–4 other rings. These crown compounds find use as complexing agents, dye components, and gelation agents.

13 Claims, No Drawings

MACROCYCLIC POLYETHER COMPOUNDS

CROSS REFERENCE TO RELATED APPLICATIONS

This application is a continuation-in-part of my copending application, Ser. No. 588,302, filed Oct. 21, 1966, now abandoned, as a continuation-in-part of my then copending original application Ser. No. 358,937, filed Apr. 10, 1964, now abandoned.

BACKGROUND OF THE INVENTION

This invention relates to novel, macrocyclic polyether compounds and to methods of producing them.

Molecular models of representative compounds of the present invention have an annular configuration suggestive of a crown, and accordingly, the macrocyclic polyethers of the present invention are denoted "crown" compounds. Complexes of these compounds with ionic metal compounds are denoted "crown" complexes.

In one embodiment of the invention the compounds of the present invention comprise macrocyclic polyether compounds composed of at least one and preferably from one to four, vicinal arylenedioxy groups or derivatives thereof joined to form a macrocyclic polyether ring of at least 14 atoms by $\alpha,\omega$ - diprimary alkylene groups or $\alpha,\omega$-diprimary alkylene ether groups, the oxygen atoms of the macrocyclic ring being separated by from two to three carbon atoms.

The upper limit to the size of the macrocyclic ring is not known. Compounds having 60 atoms in the ring have been synthesized and are useful for forming complexes with ionic metal compounds as described hereinafter. In general large ring compounds have no substantial advantage over compounds having moderate size rings in forming these complexes. Preferred are crown compounds having a macrocyclic ring containing a maximum of 28 atoms, at least five of which are oxygen.

From the above it is clear that the polyethers of the invention generally have a macrocyclic ring containing 14–60 atoms, some carbon and the remainder oxygen atoms, with each oxygen in the ring being separated from adjoining oxygens in the ring by two or three carbons, and the macrocyclic ring being fused (by a pair of vicinal carbon atoms) to 1–4 carbocyclic rings, that is, arylene groups or derivatives of arylene groups. Preferably these groups are a. phenylene, naphthalene, phenanthralene and anthralene,
b. a saturated analog of (a),
c. a substitution derivative of (a) or (b) from the group consisting essentially of halo, nitro, amino, azo, alkyl, aryl, aralkyl, alkoxy, cyano, hydroxy, carboxy and sulfo derivatives thereof.

The term "fused" is used with its conventional meaning in referring to the joining of rings by sharing of ring-carbon atoms as in naphthalene. A ring fused to the macrocyclic ring is sometimes called a "satellite ring" for convenient reference. Preferably said substitution derivative of (a) or (b) contains not more than about 30 atoms.

The macrocyclic polyethers of the present invention form complexes with a wide variety of ionic compounds, in particular, this invention includes the molecular complexes of the above-defined polyether compounds with ionic compounds of the alkali metals, ionic compounds of the alkaline earth metals having an atomic weight of at least 40, and ammonium compounds.

This invention also includes a method of making a macrocyclic polyether compound which comprises reacting an aromatic vicinal dihydroxy compound with an $\alpha,\omega$-diprimary alkylene dihalide of $\alpha,\omega$-diprimary alkylene ether dihalide, the halogen atom of the above halides being chlorine, bromine, or iodine, in the presence of at least a stoichiometric amount of a strong base for each hydroxyl group, and recovering the macrocyclic polyether compound. The $\alpha,\omega$-diprimary alkylene dihalide or diprimary alkylene ether dihalide can contain from four to 28 atoms in the chain.

The term "arylene" is intended to include phenylene, naphthalene, anthrylene, phenanthrylene and other polynuclear aromatic moieties; phenylene is preferred. "Cyclo-alkylene" refers to the ring structure resulting from saturation of an arylene group by hydrogenation, that is, the saturated analog of the arylene group.

By "derivative of an arylene dioxy group" is meant substitution derivatives of the aromatic nucleus including but not limited to halo, nitro, amino, azo, alkyl, aryl, aralkyl, alkoxy, cyano, hydroxy, carboxy, sulfo substituted arylene dioxy groups and the like. Also included as derivatives of an arylene dioxy group are the saturated ring systems formed by the hydrogenation of the aromatic nuclei or their substitution derivatives.

Provided the substituent group is inert to the reactants employed in forming the novel polyether compounds of the present invention, the group can be present in the vicinal dihydroxyaromatic compounds which are preferred starting materials for the formation of the cyclic polyether compounds. In other instances the substituent can be introduced after formation of the macrocyclic polyether ring by conventional chemical reaction, e.g., by azo coupling of an amino compound to introduce the azo grouping. In yet other instances the substituents can be formed by chemical reaction of other substituents, e.g., nitro groups can be reduced to amino groups.

Representative species are shown in the examples hereinafter.

The compounds are described by systematic names. These names are illustrated by the following formulas in which the ring positions are marked:

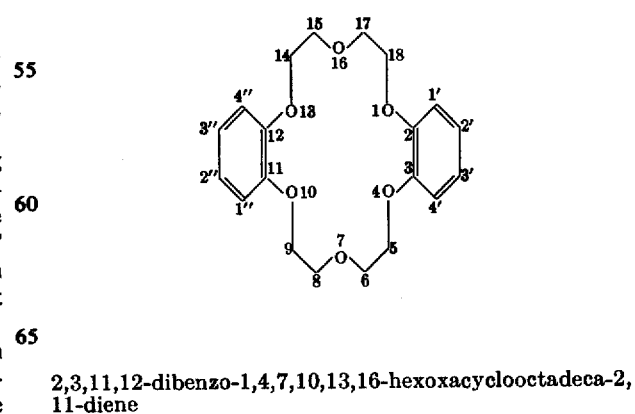

2,3,11,12-dibenzo-1,4,7,10,13,16-hexoxacyclooctadeca-2,11-diene

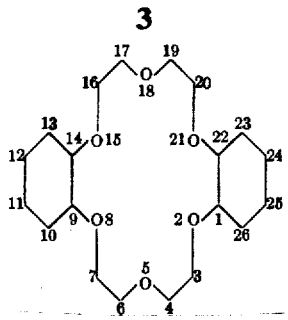

2,5,8,15,18,21-hexaoxatricyclo [20.4.0.0$^{9,14}$] hexacosane. This compound exists in the form of two stereo isomers which can be separated by conventional chromatographic techniques or by fractional crystallization.

A preferred class of compounds can be represented by the general formula:

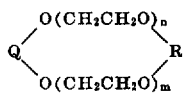

where Q and R can be divalent arylene groups with bonds attached to vicinal carbon atoms or derivatives thereof and R, additionally can be —CH$_2$—CH$_2$—.

Where R is —CH$_2$-CH$_2$—, $n + m$ can be 3 to 8 inclusive.

Where R is an arylene group or a derivative thereof $n$ can be from 1 to 9 and $m$ can be from 2 to 9.

The above class of compounds can be made with particular ease, as will become apparent from a description of the mode of synthesis described hereinafter.

In addition, another class of preferred compounds which can be readily made is:

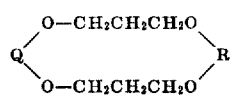

where Q and R have the same meanings as above. This class of compounds has been found particularly valuable for the manufacture of complexes of lithium salts.

The general procedures for the synthesis of compounds containing at least one arylene group involve the following reactants:

a. a vicinal dihydroxy aromatic compound such as catechol
b. an α,ω-alkylene diprimary dihalide or ether compound in which the halogen and oxygen atoms are separated by chains of two to three carbon atoms, wherein the halogen of the dihalide and ether is preferably chlorine, but can also be bromine or iodine; and
c. at least one equivalent of a strong base, preferably sodium hydroxide, for each phenolic hydroxyl group. In general, equimolar quantities of (a) and (b) are consumed. The detailed procedure is selected to favor the particular type of crown compound desired and varies depending upon the nature of the dihydric phenol and the dihalide. When more than one crown compound is present in the reaction product, conventional separation techniques such as selective solvent extraction, fractional distillation and fractional crystallization can be employed to obtain the compounds desired.

A typical reaction in which one molecule of dihydric phenol and one molecule of dihalide, as described above, are incorporated into the product as follows:

(I)
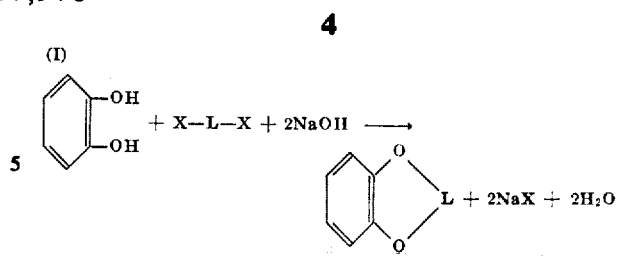

wherein L is a divalent organic group, which together with X is the ether compound of reactant (b) having at least two oxygen atoms and wherein X is halogen. For example, in making the preferred compounds

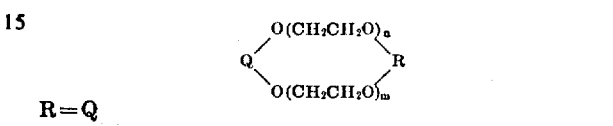

R=Q

The compound X—L—X is X(CH$_2$CH$_2$O)$_p$CH$_2$CH$_2$X where $p$ is from 1 to 7.

In some instances, a significant proportion of polyaromatic crown compound can be formed, e.g., by incorporation of 2 molecules of dihydric phenol and 2 molecules of dihalide. Typical reactions are as follows:

(II)
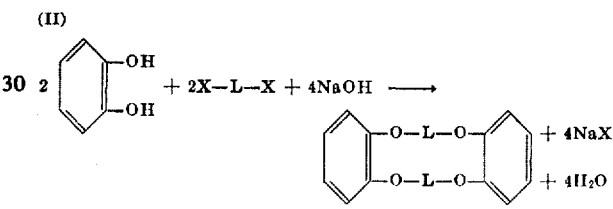

wherein L is a divalent group which together with X is either the alkylene ether dihalide or the alkylene dihalide reactant of (b), or both, and wherein X is halogen. It is to be understood that monoaromatic crown products of this type given by reaction (I) will be present too. However, it is usually preferable particularly when mixed L groups are desired, to make the polyaromatic crown compound by a sequence of reactions characterized by the use of partially blocked dihydric phenols during the formation of at least one of the ring ether groups by reaction of the residual (unblocked) phenolic hydroxyl groups with a reactant (b). Later the blocked hydroxyl groups are regenerated for further condensation reactions with the same or different reactant (b). The blocked group must be stable toward base under the conditions of the reaction with X—L—X. Regeneration of the phenolic hydroxyl group afterward should not adversely affect the ether groups present. It is convenient to block the phenolic hydroxyl group by reaction with dihydropyran, typically.

(III)
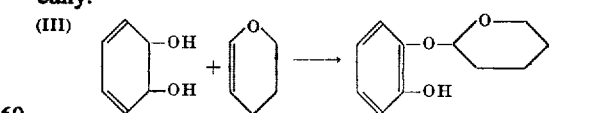

or alpha-chloromethyl ether.

(IV)
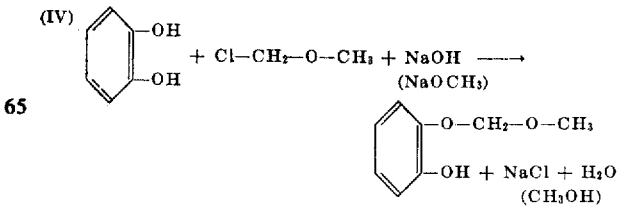

The blocked phenol is then reacted with the dihalide:

(V)
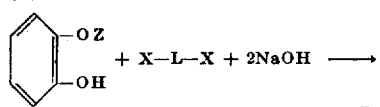

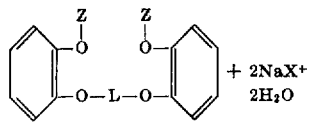

where Z is the blocking unit (e.g., —CH$_2$—O—CH$_3$).
Treatment with acid gives a dihydric compound:

(VI)
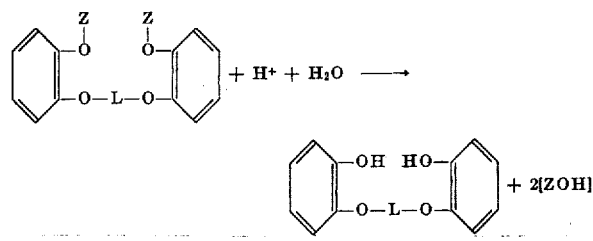

The dihydric compound can be isolated and purified, if desired. It can be partially blocked or it can be reacted directly with reactant (b). For example, the dihydric compound can be treated with a mole of X—L—X, wherein L is the same or a different divalent group from that in (V) to give a diaromatic crown:

(VII)
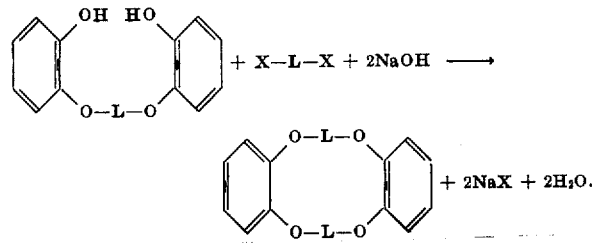

By employing a reactant (b) containing an aromatic nucleus, the number of such nuclei appearing in the polyether product can be increased to three or more. Other methods for determining the placement and quantity of aromatic nuclei in the final product will be obvious to the skilled chemist by reference to the foregoing reactions.

It is apparent that the particular dihalide or ether compound chosen for reactant (b) will determine, in part the quantity and composition of the ring atoms of the final product, with the hydroxyl oxygens and vicinal carbon atoms of the aromatic nucleus making up the remainder of the ring. The preparation of the compounds of the present invention is not limited to the foregoing typical procedures since other methods are obviously applicable to obtain the macrocyclic polyethers hereinbefore defined.

Generally, the crown compounds are made in a solvent. In order to get good results, it is desirable that the solvent dissolve the basic reagent as well as the dihydric phenol and the dihalide. Representative solvent systems include mixtures of water and butyl alcohol; lower alkyl ether derivatives of ethylene glycol; dioxane, alcohols; mixtures of ether and alcohol. The amount of solvent needed can be selected on the basis of operating convenience for a particular set of reactants.

The base for carrying out the substitution reaction is a group IA metal hydroxide, with sodium hydroxide being preferred. In place of the inorganic bases one can use quaternary ammonium hydroxides such as tetramethyl ammonium hydroxide or tetraethyl ammonium hydroxide.

The reaction can be carried out over a wide range of temperatures. For operating convenience, temperatures from about 90° C. to about 140° C. are preferred. The reaction time will vary depending upon the temperature and other factors. Other conditions being equal, the higher the temperature the shorter the time. Typically, time has ranged from about 6 hours to about 24 hours. The most suitable time and temperature for a particular set of reactants can be determined by routine experimentation.

The crown product can be isolated by conventional methods such as by concentrations of the reaction mixture or by mechanical collection of insoluble (or precipitated) product. The crown compounds are freed from impurities, such as open-chain polyethers, by recrystallization from organic liquids such as alcohol, chloroform, 2-ethanol, benzene and heptane.

Cyclic polyether crown compounds having a macrocyclic polyether ring fused to hydrogenated aromatic rings can be made by catalytic hydrogenation of the corresponding aromatic compounds by techniques familiar to those skilled in the art. Suitable hydrogenation catalysts are ruthenium dioxide, ruthenium dioxide on charcoal, ruthenium dioxide on aluminum, platinum oxide and platinum on charcoal. The solvent can be any suitable hydrogenation solvent which will dissolve the crown compounds. Dioxane is suitable as a solvent. The aromatic crown complexes of non-reducible salts such as the alkali metal halides can be hydrogenated in alcohols such as methanol and n-butanol.

The temperature of hydrogenation is suitably from 60° to 120° C. Pressures can range from 500 to 2,000 psig. Typical times required are from 3 to 20 hours. It will be realized, however, that these values are not critical.

Some cleavage of the macrocyclic polyether ring can occur, leading to the formation of dihydric alcohol byproducts in addition to the desired hydrogenation product. These products can be separated and the desired hydrogenated product can be isolated by conventional physical methods, such as fractional crystallization and the like from solvents such as alcohol, chloroform, 2-ethoxy-ethanol, benzene and heptane, or by chromatographic separation. If the desired product does not otherwise contain active hydrogen groups, the reaction product can be reacted with reagents such as organic isocyanates, which react readily with hydroxy compounds, to facilitate separation of the products.

The crown compounds described hereinabove can form novel complexes with the cations of many metal compounds. Particularly noteworthy are the complexes formed with ionic alkali metal compounds and with ionic alkaline earth metal compounds. Magnesium and beryllium compounds appear to be too covalent to form complexes of this character.

The complexes appear to be electrostatic in character rather than coordination complexes. Each cation complexes with the crown compound regardless of the valence of the cation. The cation can be inorganic or organic. A wide variety of anions both organic and inorganic can be associated with the cation in the crown complexes. When more than one cation is associated with each anion the complex will contain as many molecules of the crown compound as there are cations. In the crown complexes it is believed that the cation is located in the center of the macrocyclic polyether ring.

In general the ability to form complexes with alkali and alkaline earth metal salts depends principally on the size of the macrocyclic polyether ring. For a ring of 14 carbon atoms having oxygen atoms disposed therein alternately separated by two and three carbon atoms, complexes with the alkali metals are formed with $Li^+$ and $Na^+$. With macrocyclic polyethers having five oxygen atoms in the ring joined by five chains of two carbon atoms, complexes are formed with $Li^+$ $Na^+$ $K^+$ $Ca^{++}$ $Sr^{++}$ and $Ba^{++}$. With macrocyclic compounds having six or more oxygen atoms in the ring joined by six chains of two carbon atoms, complexes are formed with the $Li^+$ $Na^+$ $K^+$ $Rb^+$ $Cs^+$ $Cu^+$ $Ag^+$ $Au^+$ $NH_4^+$ $RNH_3^+$ $Ca^{++}$ $Sr^{++}$ $Hg^+$ $Hg^{++}$ $Tl^+$ $Pb^{++}$ $Ce^{+++}$ and the like.

In complexes of alkali metal compounds and the like, substituents in the macrocyclic polyether ring do not greatly affect the formation of the crown complexes. However, substituents do influence considerably the properties of the complexes, particularly the solubility properties of the complexes which are formed. In general the saturated crown compounds, made by the hydrogenation of the aromatic crown compounds, form complexes which are more soluble and which are more stable than complexes formed with the corresponding aromatic compound. In some instances the complexes are more soluble in organic solvents than the crown compounds themselves.

The complexes of the macrocyclic polyethers with compounds of alkali metals or alkaline earth metals can be prepared by one or more of the following methods.

Method 1—One mole of crown polyether and one mole of the metal compound are dissolved in a suitable solvent which is later removed by evaporation from the resulting complex, usually under vacuum.

Method 2—One mole of crown polyether and one mole or more of the metal compound are dissolved in a minimum quantity of hot solvent, the resulting complex being precipitated by cooling and mechanically separated, e.g., by filtration, centrifugation, etc.

Method 3—One mole of crown polyether is heated with one mole or more of the metal compound in a solvent in which only the latter is readily soluble, the polyether being converted into a crystalline complex without the system ever becoming a clear solution. The complex is recovered by filtration.

Method 4—One mole of crown polyether is warmed with thorough mixing with one mole of the metal compound. No solvent is used.

Method 5—A benzene solution of crown polyether-potassium hydroxide complex of known concentration is reacted with a protonated anion, e.g., (cyclic ether-KOH) + NH₃ ⟶ (cyclic ether-KNH₂) + H₂O (cyclic ether-KOH) + HONO₂ ⟶

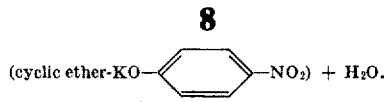

The water formed in the reaction can either be left in the solution or removed, if possible, with a chemically inert drying agent or by azeotropic distillation. The solid complex, if desired, can be obtained by removing the benzene under vacuum. An example of a suitable cyclic ether is 2,5,8,15,18,21-hexaoxatricyclo [20.4.0.0⁹·¹⁴] hexacosane. When the crown complex cannot be isolated because of instability, it can be used in the solvent in which it was prepared.

As a general rule, the greater the stability of the crown complex in a particular environment, i.e., solvent, the greater is the chance of isolating the complex in pure form. The stability constant of the crown complexes depends on the solvent in which they are contained. The crown complexes of 2,3,9,10-dibenzo-1,4,8,11-tetraoxacyclotetradeca-2,9-diene are decomposed in water; thus the solubility of this compound in water is practically unchanged by the presence of lithium bromide or sodium bromide. On the other hand, its solubility in methyl alcohol is increased almost 10-fold when lithium bromide is introduced. The complex formed by 2,3,9,10-dibenzo-1,4,8,11-tetraoxacyclotetradeca-2,9-diene and the lithium ion in methyl alcohol can serve as a means for tying up the ion therein for removal from the alcohol and subsequent release in water.

The increase in solubility due to complex formation is even more dramatically illustrated in normal butyl alcohol where the introduction of lithium bromide causes a 33-fold increase in the solubility of 2,3,9,10-dibenzo-1,4,8,11-tetraoxacyclotetradeca-2,9-diene. In similar fashion, the solubility of 2,3,11,12-dibenzo-1,4,8,11,-tetraoxacyclotetradeca-2,9-diene. In similar fashion, the solubility of 2,3,11,12-dibenzo-1,4,7,10,13,16-hexaoxacyclooctadeca-2,11-diene which has an 18-atom structure in which the oxygen atoms are very symmetrically arranged, is increased 5.5-fold at 26° C. in the presence of sodium chloride, 8.9-fold in the presence of strontium chloride, but depressed to 56 percent in the presence of magnesium chloride with which it does not complex.

The order of stability of the complexes formed between the crown compounds and ionic alkali metal compounds can be determined conveniently and rapidly by extraction experiments. By way of illustration, the extraction of alkali metal compounds from aqueous solution into methylene dichloride by the crown compound 2,5,8,15,18,21-hexaoxatricyclo [20.4.0.0.⁹·¹⁴] hexacosane (referred to for convenience as CR) will be described.

A solution of the crown compound and picric acid in methylene dichloride was made containing 0.05 mole per liter of CR and 0.05 mole of picric acid. This solution was shaken with an equal volume of an aqueous solution containing a known volume of the selected metal salt at a concentration of 0.5 or 1.0 molar. The organic phase containing crown complexed picrate was then separated and the metal ions recovered from this organic phase by shaking with concentrated aqueous HCl. The results are expressed as percentage of the maximum theoretical amount extractable (0.05 mole per cycle in this instance). Experiments show that in the absence of the crown compound the picrates were not extracted from aqueous solution by the methylene dichloride.

TABLE 1

Extraction of alkali metal ions as crown complex in methylene dichloride

| Salt | Concentration, M | % CR Complex Formed |
|---|---|---|
| LiCl | 1.0 | 27 |
| $Na_2CO_3$ | 0.5 | 30 |
| NaCl | 1.0 | 34 |
| KOH | 1.0 | 95 |
| $K_2CO_3$ | 0.5 | 95 |
| KOAc | 1.0 | 95 |
| KCl | 1.0 | 95 |
| $Cs_2CO_3$ | 0.5 | 5 |
| CsF | 1.0 | 69 |

Similar results can be obtained by spectoscopically analyzing at 376 millimicrons the clear methylene chloride solution of the crown compound/metal picrate solution. For convenience, concentrations of crown compound and picric acid of $7 \times 10^{-5}M$ are employed to obtain extinction coefficients in a range convenient for measurement, i.e., below an optical density of 1.5. Using this procedure and CR above as the crown compound, the extraction efficiency of 0.1M metal hydroxide solution was found to be 2.4% for $Li^+$ 18.6%, 24.9% for $Na^+$, 83.7%, 73.0% and 77.8% for $K^+$; 56.4% for $Rb^+$; 36.7%, 43.5% for $Cs^+$; 56.8%, 51.2% and 52.8% for $Ba^{++}$ and 95.4% for Pb.

Similar extraction procedures can be employed to determine the relative complexing power of other crown compounds of this invention with the above-named and other cations. The formation of these crown complexes with metal salts can also be detected and determined by ultraviolet spectroscopy.

The formation of crowned complexes makes it possible to use certain chemical reagents in non-aqueous or non-alcoholic media wherein they are normally insoluble. For example, a benzene-soluble complex of potassium hydroxide is prepared by reacting equimolar amounts of potassium hydroxide and 2,3,11,12-bis(t-butylbenzo)-1,4,7,10,13,16-hexaoxacyclooctadeca-2,11-diene in methanol and completely removing the solvent by evaporation. In a typical experiment, the benzene solution made by stirring this solid complex in benzene at 25°C. and on filtering is found to be 0.02 normal in basicity. On the other hand, if finely divided potassium hydroxide is vigorously stirred in boiling benzene and the resulting mixture filtered to exclude dispersed solid potassium hydroxide, the benzene filtrate contains essentially no potassium hydroxide.

The hydrogenated compound 2,5,8,15,18,21-hexaoxatricyclo [20.4.0.0$^{9,14}$] hexacosane can be used in the same manner to make a toluene solution of potassium hydroxide approximately 0.3N in basicity.

Neither sodium nitrite nor potassium permanganate is soluble in benzene. The former can be made soluble in benzene in exactly the same way as potassium hydroxide. Potassium permanganate is rendered soluble in benzene by reacting equimolar quantities of potassium permanganate and 2,3,11,12-bis(t-butyl benzo)-1,4,7,10,13,16-hexaoxacyclooctadeca-2,11-diene in acetone and completely removing the solvent from the crowned complex by evaporation.

In general, these benzene-soluble crowned complexes are new analytical reagents for use in non-hydroxylated media wherein the uncrowned reagents are normally insoluble. Furthermore, these complexes can be used for industrial processes. The benzene-soluble potassium hydroxide complex can be employed to initiate the anionic polymerization of acrylonitrile or pivalolactone, a hydroxyl-terminated polymer product resulting. It can also be used as a soluble acid-acceptor in nonprotic systems. The benzene-soluble sodium nitrite complex can be used as a corrosion inhibitor of iron and steel in non-aqueous systems, and to effect the diazotization and nitrozation of amino compounds in non-hydroxylic media. The benzene-soluble potassium permanganate complex can be used to prepare epoxides from olefinic compounds and to effect the fission of these compounds. In general, then, nearly any reaction in which the uncrowned reagents can participate in aqueous or alcoholic media can be carried out in non-hydroxylic media by using the corresponding crowned reagents.

Potassium 2-ethylhexanoate is practically insoluble in cyclohexane, and the electrical resistance of cyclohexane in contact with this salt is not much less than that of the solvent by itself. The tertiary-butyl crowned potassium 2-ethylhexanoate is soluble in cyclohexane and reduces the electrical resistance, that is, increases the electrical conductivity; hence, these solubilized crowned salts can be used to increase the electrical conductivity of non-protic systems.

The crown compounds are useful for the separation of dissolved salts. The salt which can form a crown complex can thereafter be extracted by an immiscible solvent which cannot dissolve the uncomplexed salts present. By way of illustration, water soluble salts that form crowned complexes can be separated from salts that do not; a water-insoluble solvent for the complex is employed for the extraction. For example, 2,5,8,15,18,21-hexaoxatricyclo [20.4.0.0$^{9,14}$] hexacosane complexes with potassium ion, but not with magnesium ion; hence, potassium salts can be separated from magnesium salts by this method.

The crown compounds of the present invention can also be used as dye intermediates by adding an active hydrogen containing substituent, e.g., OH—, amino, to the aromatic nucleus by conventional techniques and thereafter coupling the compound with a diazo compound according to well-known methods. By way of illustration, azo dyes were prepared from 2,3,8,9-dibenzo-1,4,7,10-tetraoxacyclododeca-2,8-diene; 2,3,11,12-dibenzo-1,4,7,10,13-pentaoxacyclooctadeca-2,11-diene and 2,3,11,12-dibenzo-1,4,7,10,13,16-hexaoxacyclooctadeca-2,11-diene as follows:

The aromatic nitro derivative corresponding to the desired amino crown compound is obtained by refluxing for 2 hours, while being very vigorously agitated, a mixture of (a) chloroform solution of the crown compounds (relative concentration 1.5 g./30 ml.) and (b) concentrated nitric acid diluted with an equal volume of water (relative concentration 7 ml. of this solution per 1–2 g. of crown compound).

The aromatic amino compound is prepared by reducing the nitro compound of the previous step with excess metallic tin in methanol containing concentrated hydrochloric acid (relative concentration 50 ml. of methanol plus 5 ml. of hydrochloric acid/1–2 g. of original crown compound). Catalytic hydrogenation of the nitro compound yields the corresponding amino-saturated compound (e.g., each nitrophenylene ring is converted to an amino cyclohexylene ring).

The aromatic amino compound is diazotized by treating the previous solution with an excess of strong aqueous sodium nitrite in the presence of ice; the excess nitrous acid so formed is decomposed with sodium sulfamate.

The azo dye is obtained by adding the solution of the diazo compound so formed to a strongly alkaline (sodium hydroxide) aqueous solution of 1-amino-8-naphthol-3,6-disulfonic acid, the latter being in excess of the diazo compound. Cellulosic based materials (viz. cloth and paper) are dyed by warming them with the azo dye solution obtained in the previous step, rinsing the materials with clean water and drying. Azo dyes can also be prepared from the other crown compounds of this invention in a similar or other manner.

Hydrocarbon soluble complexes of the cyclic polyethers with potassium hydroxide or potassium salts of weakly acidic compounds (e.g., 2-ethyl-hexanoic acid and m-nitrophenol) are strong catalysts for the polymerization of formaldehyde and the trimerization of isocyanates.

It is well known that aliphatic and aromatic isocyanates form trimers (trisubstituted isocyanurates) when treated with various basic catalysts. Diisocyanates and polyisocyanates can react further to give highly polymerized resins presumably containing isocyanurate rings joined in a branched structure. Any of the complexes which can be derived from selected basic alkali metal salts and certain of the cyclic polyethers of this invention are highly active catalysts for converting organic isocyanates to trimers. The preparation of these complexes has been described hereinbefore. The preferred complexes are those obtained from saturated cyclic polyethers and basic potassium salts such as the hydroxide, acetate, 2-ethyl hexanoate and cyanide. Especially preferred are complexes of 2,5,8,15,18,21-hexaoxatricyclo [20.4.0.0$^{9.14}$] hexacosane and potassium salts of phenols. The basic salt complexes are useful for effecting the trimerization of organic isocyanates in general; including aliphatic, cycloaliphatic, aromatic and arylalkyl types having one or more isocyanate groups per molecule. The catalysts can also be used to crosslink low molecular weight polymers having —NCO groups. Trimerization with these catalysts may be conducted in the presence of dry, inert solvents such as benzene and acetone or in the absence of solvents. With aromatic isocyanates trimerization can be initiated at room temperature by adding about 0.01–0.1 part of complex per 100 parts of isocyanate. Due to the exothermic nature of the reaction, the temperature rises if cooling is not provided. In the case of aliphatic isocyanates, which trimerize sluggishly relative to aromatic isocyanates, it may be desirable to heat the reaction mass to provide a reasonable rate of reaction.

A preferred procedure for preparing trimers from 2,4- or 2,6-tolylene diisocyanate or mixtures thereof involves adding about 0.03 part of the complex of 2,5,8,15,18,21-hexaoxatricyclo [20.4.0.0$^{9.14}$] hexacosane and the potassium salt of 2,4,6-tri-tert-butyl phenol to 100 parts of diisocyanate at about 25° to 50° C. The complex is conveniently handled in the form of a concentrated solution in benzene. Following catalyst addition, the reaction mass is allowed to heat up of its own accord. On reaching a temperature of about 120°–155° C., the reaction stops automatically with commercial grades of diisocyanate apparently due to deactivation of the catalyst. When run on a large scale, about 0.03 phr. of benzoyl chloride should be added to the diisocyanate prior to catalyst addition to insure cut-off of the reaction at 120°–155° C. At this point, about 40–60 percent of the tolylene diisocyanate has been converted to trimer and very little polymeric material has been formed. The solution of trimer in diisocyanate may be used as such, diluted with additional diisocyanate, or isolated by removing unreacted diisocyanate by vacuum distillation.

Benzene-soluble complexes of potassium hydroxide also bring about the alkaline hydrolysis of the esters of 2,4,6-trimethylbenzoic acid; this is a surprising result since these esters are normally very resistant to alkaline hydrolysis and appear to be unaffected by prolonged boiling with potassium hydroxide itself.

A benzene-soluble complex of cyclic polyether with potassium hydroxide also causes a solution of 5-amino-2,3-dihydro-1,4-phthalazinedione (Luminol) in dimethylformamide or dimethyl sulfoxide to chemiluminesce brilliantly in air. It also ionizes metal-free phthalocyanine to give a benzene solution of the phthalocyanine anions which regenerate the phthalocyanine by protonation.

As stated above, the macrocyclic polyethers of this invention contain a macrocyclic ring fused to 1–4 other aromatic or alicyclic rings (satellite rings). The satellite rings can be the same or different and can be arylene (e.g., phenylene) or perhydro (fully saturated) analogs thereof (e.g., cyclohexylene) or substituted derivatives of these, the substituents being one or more or a combination of the groups: halo, nitro, amine, azo, alkyl, aryl, aralkyl, alkoxy, cyano, hydroxy, carboxy, chlorocarbonyl, carbalkoxy and sulfo, or any other substituents available through the known reactions or organic chemistry. Such groups provide crown compounds with additional functionality and the attendant reactivity and usefulness without detracting from its utility as a complexing agent described above.

Two methods are available for synthesizing these substituted crown compounds in which one or more substituents are attached to one or more satellite rings. In one method a vicinal dihydroxy aromatic compound which has one or more substituent groups is reacted with an α, alkylene diprimary dihalide or other compound as previously described. In this case, the substituent group(s) must in general be reasonably stable towards the strong caustic needed to promote the desired ring-closure reaction. Among such groups are carbalkoxy, alkyl, aryl, aralkyl, alkaryl, alkoxy, aryloxy, dialkylamino, etc., as is well known to those familiar with organic reactions. Alkali sensitive groups such as iodo, nitro and groups containing the structure

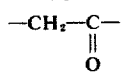

are preferably introduced by the second method as set forth below. For example, 1,2-dihydroxy-4-carbomethoxy benzene reacts with β,β'-dichlorodiethyl ether in butanol in the presence of sodium methoxide to produce a crown compound with two carbobutoxy substituent groups, one in each phenylene ring.

In this particular example, and in general, the final product is a mixture of two isomers, which, if desired, can be separated by fractional crystallization or by chromatographic methods.

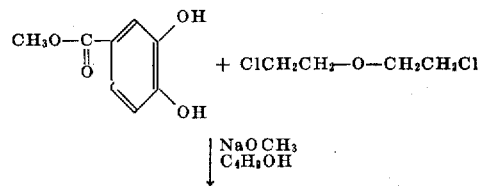

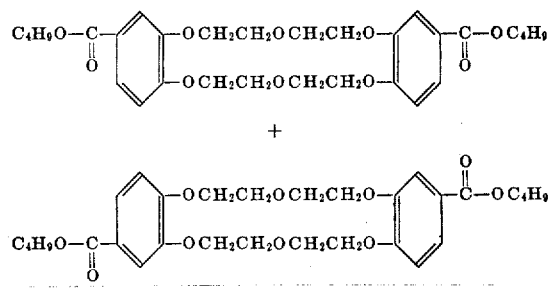

This particular method fixes unequivocally the positions of the substituent groups relative to the vicinal oxygens of the aryl ring but where symmatry is lacking, as indicated above, closure of the control ring provides two isomers. Similarly, 1,2-dihydroxy-3-methyl benzene reacts with β,β'-dichloroethyl ether to yield the two isomers:

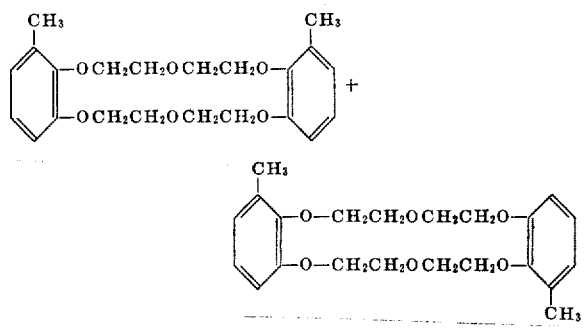

When mixtures of vicinal dihydroxy aromatic compounds having different substituents, are used in the synthesis, mixtures of substituted crowns result.

The second method of synthesizing substituted crowns involves the direct reaction of the arylene crown compound with reagents capable of introducing the desired substituent group. Thus, a crown compound with arylene satellite ring(s) can be nitrated, halogenated, sulfonated and acetylated by known methods of organic chemistry to substitute a nitro, halo, sulfo or acetyl group, respectively, for a hydrogen on the satellite ring(s). The macrocyclic polyether ring has a reaction stability substantially the same as a poly(ethylene oxide) chain and therefore causes little concern. The substitution chemistry of the arylene crown compounds is substantially that of the alkyl ethers of the vicinal dihydroxy aromatic compounds. Thus, for example, the known reactions of the alkyl ethers of catechol are available for the preparation of substituted crowns where the parent crown compound contains one or more fused phenylene groups and the known reactions of vicinal dialkoxy naphthalene apply to crowns containing one or more fused naphthalene groups, etc.

This general method can provide both mono- and higher substitution derivatives of crown compounds, that is, crown compounds in which one or more of the satellite rings carries one or more substituent groups. When a mixture of isomers is obtained these can be separated by conventional means such as fractional crystallization or chromatographic methods. To illustrate, the crown compound of Example 4 can be acetylated to yield a monoacetyl derivative as well as the diacetyl derivative, the latter which, as expected, consists of a mixture of two isomers:

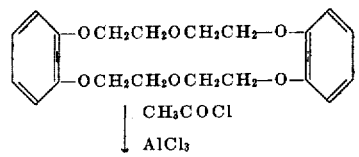

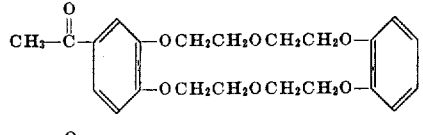

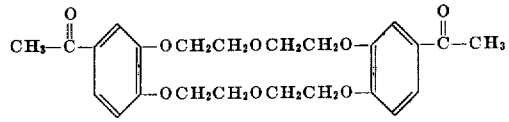

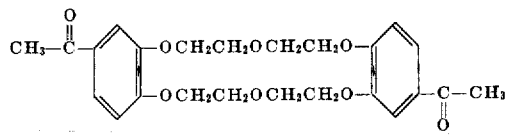

By the known method of hypobromite oxidation, the above acetyl compounds can be oxidized to the corresponding acids which in turn may be converted to esters and acid chlorides and these then can be further converted to amides, N-substituted amides, hydrazides, and numerous other known derivatives of carboxylic acids.

Reaction of the parent arylene crown compound with formaldehyde produces a methylol derivative which can be reacted further with additional arylene crown compound to produce polymers containing the crown structure. The methylol crown monomer can also be esterified with an unsaturated acid (e.g., acrylic acid) or the equivalent to produce an ethylenically unsaturated crown compound capable of addition polymerization by conventional procedures to produce homopolymers and copolymers. By reaction with nitric acid the nitro derivatives of the crowns can be made available and thus, by reduction, provide the corresponding amino compounds which, in turn, can be alkylated and acetylated to provide alkyl amino derivatives and amides. Additionally, the amino derivatives can be diazotized and the diazonium compound coupled with suitable aromatic compounds, 1-amino-8-naphthol-3,6-disulfonic acid, for example.

Also the diazonium constituent can be converted readily to other substituents such as hydroxyl, halogen and nitrile. For example, heating the diazonium derivative of the crown compound with an aqueous solution of sulfuric acid produces the hydroxyl derivative. Similarly, treatment of the diazonium derivative with cuprous chloride or cuprous bromide produces the chloride and bromide derivatives, respectively. Treatment of the diazonium salt with potassium iodide results in iodo crown compound and reaction of the salt with cuprous cyanide produces the corresponding nitrile.

Sulfonation produces sulfonic acids, precursors for sulfonyl chlorides, sulfonamides and the like, all by known synthetic methods.

The fully reduced substituted crowns are readily available by catalytic reduction of the various arylene crown compounds described above. In some case, the substituent group is altered by reduction, in other cases, not. Thus, alkyl, alkyloxy and methylol remained unchanged by catalytic reduction of the aromatic ring system and the corresponding fully reduced substituted crowns are obtained. Other substituents can be themselves altered during the reduction. For example, a nitro group attached to the arylene ring can be converted to an amino group; an acetyl group can be converted to the corresponding hydroxyl-containing moiety, a carboalkoxy group to a methylol group, an aryleneoxy group to a cycloalkyloxy group, etc., as is well known in organic chemistry.

An important feature of the crown compounds of the present invention is their ability to form complexes with various cations and the substituted crowns provide for even broader utilization of this complex-forming ability. Substituents can be introduced for the purpose of altering solubility characteristics and to provide a specifically desired chemical reactivity not present in the parent compound. For example, dicarboxylic acid derivatives (e.g., the acid chlorides or esters) can be polymerized to polyesters or polyamides and thus provide polymeric fibers and films having "ion-specific" properties. Such fibers and films may be used as compounds of ion-specific electrodes useful to determine concentrations of $Na^+$ or $K^+$ by potentiometric methods. Additionally, such fibers or films can be used to remove ions, capable of complexing with the crown moiety from aqueous and organic solutions. The crowns and the substituted crowns are also capable of altering electrical properties of organic liquids and polymers. Crown complexes which are soluble in organic material enhance electrical conductivity and mixtures of such complexes with polymers provide a means for dissipating dangerous electrostatic potential build-up. On the other hand, if an insoluble crown compound is incorporated into an organic polymer it tends to rearrange ionic impurities because of its complexing ability and thus increases the electrical resistance of the polymer and enhances its utility as an insulator. In this respect, alteration and control of solubility characteristics of the crown compounds by substitution on the fused rings (for hydrogen) by conventional reaction of appropriate substituent groups provides for added flexibility in using the crown compounds and their complexes in a wide variety of applications.

Certain of the crown compounds, independently of their ability to form complexes, exhibit unexpected properties in that they are powerful gelation agents for organic solvents, including hydrocarbons of the type used as fuels. A mixture of hexane and the carbobutoxy derivatives of the crown compound of Example 4, Part A, for example, forms a vaseline-like gel and thereby converts the liquid to a solid fuel. Such gels are thixotropic and therefore capable of flow when suitably agitated.

When a substituent of substitution derivatives of a satellite ring fused to the macrocyclic ring in a group containing an alkyl or alkylene radical, ($C_1$—$C_8$) alkyl or alkylene radicals are preferred for convenience although larger radicals can be present. Similarly aryl substituent groups preferably contain less than 11 carbon atoms.

EXAMPLE 1

A. Preparation of 2,3,9,10-dibenzo-1,4,8,11-tetraoxacyclotetradeca-2,9-diene; $C_{18}H_{20}O_4$ Mol. Wt. 300

A 1-liter round-bottom flask, equipped with a thermometer, a reflux condenser, and an agitator, was charged with 13 grams (0.05 gram-mole) of 1,3-bis(o-hydroxyphenoxy) propane, 400 ml. of water, 4 grams (0.1 gram-mole) of sodium hydroxide and 10.1 grams (0.05 gram-mole) of 1,3-dibromopropane. At atmospheric pressure the charge was refluxed under nitrogen while vigorously agitated for 22 hours; during this time the pot temperature rose from 100° to 102° C.

The reaction mixture was then extracted with 750 ml. of benzene at 26° C.; the organic phase was separated, washed twice with 100 ml. of 5 percent aqueous sodium hydroxide, filtered through fine paper and evaporated to dryness at 0.5 mm. Hg pressure (while heated). The concentrate, 11.8 grams of light buff crystals, was recrystallized from methanol to give 4 grams of white, fibrous nearly pure crystals of the desired product. Pure product was obtained by distillation at 0.35 mm. Hg (while heated).

|  | Found for Product | Calculated for $C_{18}H_{20}O_4$ |
|---|---|---|
| C:% | 71.5, 71.8 | 72.0 |
| H:% | 6.5, 6.7 | 6.7 |
| Molecular Weight | 299 | 300 |
| Melting point: 150–2° C. (aluminum block) | | |
| Infrared spectrum: no OH band | | |
| Ultraviolet spectrum: | | |
| Cyclohexane: | | 274.5 mu ←= 4,100 |
| | | 279.5 mu ←= 3,900 |
| Methanol: | | 276–279 mu ←= 5,000 |
| NMR spectrum: consistent | | with proposed structure. |

B. Preparation of 2,3,9,10-bis(tert-butyl benzo)-1,4,8,11-tetraoxacyclotetradeca-2,9-diene;

$C_{26}H_{30}O_4$ Mol. Wt. 412

A 2-liter round-bottom flask, equipped with a thermometer, a reflux condenser, and an agitator, was charged with 117 grams (0.314 gram-mole) of 1,3-bis(o-hydroxy-x-tert-butylphenoxy) propane, 350 ml. of water, 350 ml. of n-butanol, 25.1 grams (0.628 gram-mole) of sodium hydroxide, 120 grams of sodium bromide and 63.4 grams (0.314 gram-mole) of 1,3-dibromopropane. The resulting mixture was refluxed at atmospheric pressure under nitrogen, while vigorously agitated, for 22 hours; during this time the pot temperature rose from 99° to 100.5° C.

On cooling, the charge formed two layers. The upper, brown, organic phase was separated and evaporated to dryness at 0.5 mm. Hg pressure (while heated). The residue, weighing 135 grams, was dissolved in 400 ml. of benzene, filtered through fine paper and evaporated to dryness at 0.5 mm. (while heated). The first fraction, 52.6 grams of light brown liquid, which solidified on standing at room temperature (25°–30° C.), gave on titration with 230 ml. of methanol and drying, 14.4 grams of white fluffy powder. The loss of product was heavy in the last step.

|  | Found for Product | Calculated for $C_{26}H_{30}O_4$ |
|---|---|---|
| C:% | 76.0, 76.3 | 75.8 |
| H:% | 8.6, 8.8 | 8.7 |
| Molecular Weight | 433 | 412 |
| Melting point: | 149–152°C. (aluminum block) | |
| Infrared spectrum: | No OH band | |
| Ultraviolet spectrum: | | |
| Cyclohexane: | 278 mu ← =4,500 | |
|  | 281.5 mu ← =4,200 (shoulder) | |
| Methanol: | 277 mu ← =4,900 | |

C. Preparation of 2,6,13,17-Tetraoxatricyclo [16.4.0.0$^{7\text{-}12}$] docosane $C_{18}H_{32}O_4$ Mol. Wt. 312

A 400-ml. stainless steel shaker bomb was charged with 1.75 g. (0.0058 mole) of 2,3,9,10-dibenzo-1,4,8,11-tetraoxacyclotetradeca-2,9-diene, 100 ml. of p-dioxane and 0.25 g. of ruthenium dioxide. The bomb was readied for hydrogenation and the charge was hydrogenated at 100° C., 1,600 psig. for four hours with good agitation.

The reaction mixture was filtered and stripped in a vacuum rotary evaporator. White crystals, 1.6 g., of the crude product were obtained. Yield: about 88 percent. The pure product was obtained by crystallization from petroleum ether.

|  | Found for Product | Calculated for $C_{18}H_{32}O_4$ |
|---|---|---|
| C:% | 69.2, 69.4 | 69.2 |
| H:% | 10.2, 10.3 | 10.3 |
| Melting point: | 153.5–155.5°C. | |
| Infrared spectrum: no OH band | | |
| NMR spectrum: consistent with proposed structure. | | |

D. Preparation of 9,20 or 21-di-(tert-butyl)-2,6,13,17-tetraoxatricyclo-[16.4.0.0$^{7\text{-}12}$] docosane $C_{25}H_{48}O_4$ Mol. Wt. 424

A 500-ml. stainless steel shaker bomb was charged with 16.7 g. (0.0404 mole) of 2,3,9,10-bis(4' and/or 5'-tert-butylbenzo)-1,4,8,11-tetraoxacyclotetradeca-2,9-diene, 200 ml. of p-dioxane and 3 g. of ruthenium dioxide. The bomb was readied for hydrogenation and the charge was hydrogenated at 100° C., 1,600 psig for 3 hours with good agitation.

The reaction mixture was filtered and stripped in a vacuum rotary evaporator. The residue, 15.3 g. of colorless glass, was placed on a 9 × 1.75 inch column of alumina and eluted with 200 ml. of n-hexane. The product, 7.3 g. of colorless glass was recovered from eluate. Yield: 42.5 percent.

|  | Found for Product | Calculated for $C_{26}H_{48}O_4$ |
|---|---|---|
| C:% | 73.7, 74.0 | 73.6 |
| H:% | 10.3, 10.4 | 11.3 |
| Molecular Weight | 385, 389 | 424 |
| Infrared spectrum: no OH band | | |

EXAMPLE 2

Preparation of 2,3,8,9-dibenzo-1,4,7,10,13-pentaoxacyclopentadeca-2,8-diene; $C_{18}H_{20}O_5$ Mol. Wt. 316

A 500-ml. round-bottom flask equipped with a thermometer, a reflux condenser, and an agitator, was charged with 6 grams (0.024 gram-mole) of 1,2-bis(o-hydroxyphenoxy) ethane, 37 ml. of monoethyl ether of ethylene glycol, 37 ml. (0.049 gram-mole) of 5 percent aqueous sodium hydroxide and 3.54 grams (0.025 gram-mole) of bis(beta-chloroethyl) ether. For 17 hours the charge was refluxed under nitrogen and vigorously agitated; the pot temperature rose from 101.5° to 102.5 °C.

The entire charge was evaporated to dryness at 0.5 mm. Hg. The residue, 11.1 grams, was dissolved in 180 ml. of chloroform. The resulting solution was washed twice with 100 ml. of 1 percent aqueous sodium hydroxide, filtered through fine paper, and evaporated to dryness at 0.5 mm. Hg (while heated). The white solid residue, 5.7 grams, contained 3.3 grams of product. The pure product was obtained as shiny white crystals by crystallizing the residue twice from methanol.

|  | Found for Product | Calculated for $C_{17}H_{20}O_5$ |
|---|---|---|
| C:% | 68.4, 68.4 | 68.4 |
| H:% | 6.2, 6.4 | 6.3 |
| Molecular Weight | 328 | 316 |
| Melting point: | 106–7°C. (aluminum block) | |
| Infrared spectrum: no OH band | | |
| Ultraviolet spectrum: | | |
| Cyclohexane: | 274 mu ← =4,500 | |
|  | 278 mu ← =4,400 | |
| Methanol: | 273.4–277 mu ← =4,700 | |

EXAMPLE 3

Preparation of 2,3,9,10-dibenzo-1,4,8,11,14-pentaoxacyclohexadeca-2,9-diene; $C_{19}H_{22}O_5$ Mol. Wt. 330

A 2-liter round-bottom flask equipped with a thermometer, a reflux condenser, and an agitator, was charged with 25 grams (0.1 gram-mole) of 1,3-bis(o-hydroxy-phenoxy) propane, 200 ml. of water, 100 ml. of n-butanol, 7.7 grams (0.19 gram-mole) of sodium hydroxide and 13.8 grams (0.1 gram-mole) of bis-(beta-chloroethyl) ether. The vigorously agitated charge was refluxed under nitrogen at atmospheric pressure for 22 hours; during this time the pot temperature rose from 92.5° to 94.8° C.

The charge was then cooled to room temperature (25°–30° C.) and acidified with hydrochloric acid. After 200 ml. of water had been added, most of the n-butanol was removed by distillation at atmospheric pressure. The organic phase was dissolved in 200 ml. of chloroform and the resulting mixture was filtered through fine paper and evaporated to dryness at room temperature at 0.5 mm. Hg pressure. The residue, 29.8 grams of brown, viscous oil, was heated at 0.4 mm. to give 13.6 grams of distillate which solidified on standing at room temperature. After being washed with cold methanol and dried, this fraction weighed 7.5 grams. When it was distilled while heated at 0.4 mm., 6.6 grams were collected; this portion yielded 5.8 grams on being washed with methanol and dried.

|  | Found for Product | Calculated for $C_{19}H_{22}O_5$ |
| --- | --- | --- |
| C:% | 68.7, 68.9 | 69.1 |
| H:% | 6.5, 6.6 | 6.8 |
| Molecular weight: | 330 | |
| Melting point: | 117–8°C. (aluminum block) | |
| Infrared spectrum: no OH band | | |
| Ultraviolet spectrum: | | |
| Cyclohexane: | 274.5 mu | ← = 4,400 |
|  | 279.5 mu | ← = 4,400 |
| Methanol: | 274.5–278.5 mu | ← = 4,300 |
| NMR spectrum: consistent with proposed structure. | | |

EXAMPLE 4

A. Preparation of 2,3,11,12-dibenzo-1,4,7,10,13,16-hexaoxacyclooctadeca-2,11-diene; $C_{20}H_{24}O_6$ Mol. Wt. 260

1. Procedure 1

A liter round-bottom flask equipped with a thermometer, a reflux condenser, and an agitator, and continuously covered with nitrogen, was charged with 55 grams (0.5 gram-mole) of catechol, 300 ml. of ethyleneglycol monoethyl ether and 20 grams (0.5 gram-mole) of sodium hydroxide pellets. Good agitation was provided. The charge was refluxed for 16 minutes (pot temperature 128° C.). Thirty and half milliliters (0.26 gram-mole) of bis(beta-chloroethyl) ether were then added and reluxing continued for 3 hours and 48 minutes (pot temperature 125° C.). Heating was stopped temporarily, 20 grams (0.5 gram-mole) of sodium hydroxide pellets were added and heating was resumed for 1 hour (pot temperature 125° C.). Thirty and a half milliliters (0.26 gram-mole) of bis-(beta-chloroethyl) ether were added and reluxing continued for 17 hours. Finally, 3.8 ml. (0.032 gram-mole) of bis-(beta-chloroethyl) ether were added and refluxing continued for one hour more (pot temperature 123° C.).

The entire charge was poured, while still hot, into 1,200 ml. of water and warmed on the steambath for about an hour. The solids were recovered by filtration, washing with water and drying in a vacuum oven at 40° C. The slightly gray, dry solids (89.5 grams) contained 52.8 grams of desired product. The solids were slurried with 200 ml. of acetone, filtered, washed with 200 ml. of acetone and dried. The purified product (36.9 grams) was obtained as white, fine crystals.

The product lost in the acetone can be recovered by converting it into the potassium thiocyanate complex.

2. Procedure 2

A 500-ml. round-bottom flask equipped with a thermometer, a reflux condenser, and an agitator, was charged with 5.02 grams (0.0173 gram-mole) of bis-[2-(o-hydroxyphenoxy)ethyl] ether, 50 ml. of water, 50 ml. of n-butanol, 1.384 grams (0.0346 gram-mole) of sodium hydroxide and 2.68 grams (0.0187 gram-mole) of bis-(beta-chloroethyl) ether. The charge was refluxed under nitrogen, while vigorously agitated, for 23 hours and 37 minutes; during this time the pot temperature rose from 94° to 95° C.

On cooling to room temperature, the charge separated into two layers. The white hair-like crystals filling the upper layer were filtered, washed with methanol and dried. The recovered crystals weighed 2.3 grams and were 91 percent pure. The rest of the charge contained 2.95 grams of product, or a total of 5.05 grams. The pure product was obtained by distillation at 0.4 mm. (while heated).

|  | Found for Product | Calculated for $C_{20}H_{24}O_6$ |
| --- | --- | --- |
| C:% | 66.2, 66.3 | 66.6 |
| H:% | 6.6, 6.9 | 6.7 |
| Molecular weight: | 371 | 360 |
| Melting point: | 163.5°C. (aluminum block) | |
| Infrared spectrum: | | |
| Cyclohexane: | 274.5 mu | ← = 4,400 |
|  | 278.5 mu | ← = 4,700 |
|  | 283.5 mu | ← = 3,600 |
| Methanol: | 277 mu | ← = 5,300 |
| NMR spectrum: consistent with proposed structure. | | |

B. Preparation of 2,3,11,12-bis(t-butyl benzo)-1,4,7,10,13,16-hexaoxacyclooctadeca-2,11-diene $C_{28}H_{40}O_6$ Mol. Wt. 472

A 3-liter round-bottom flask equipped with a thermometer, a reflux condenser, and an agitator, was charged at 26° C. with 402 grams (1 gram-mole) of bis-[2-(o-hydroxy-x-tert-butylphenoxy)-ethyl] ether, 600 ml. of n-butanol, 400 ml. of water, 80 grams (2 gram-moles) of sodium hydroxide and 143 grams (1 gram-mole) of bis-(beta-chloroethyl) ether. The charge was refluxed under nitrogen at atmospheric pressure with vigorous agitation for 41 hours; the final pot temperature was 97.5° C.

On cooling to room temperature (25°–30° C.), the charge separated into two layers. The top organic phase was separated, evaporated to dryness at 0.5 mm. Hg pressure and dissolved in 1,250 ml. of n-butanol by warming to 60° C. One hundred grams (1.03 moles) of potassium thiocyanate were added, crushed and stirred in the system while heating on the steam bath was continued. When all the thiocyanate had been dissolved, the charge was evaporated to dryness at 0.5 mm. The residue, 514 grams, was warmed in the presence of 1 liter of benzene and the resulting white crystals were filtered, washed with 100 ml. of benzene and 100 ml. of petroleum ether, (b.p. 30°–60° C.) and dried. The white crystals obtained weighing 98.4 grams, were those of potassium thiocyanate complex of the desired product: $C_{28}H_{40}O_6 \cdot KCNS$. This is equivalent to 81.6 grams of $C_{28}H_{40}O_6$.

Pure $C_{28}H_{40}O_6$ was prepared by dissolving the complex in 300 ml. of methanol and slowly adding the solution to 1 liter of hot water. After the methanol had been removed and the residue had been cooled, the resulting white crystals were filtered, washed with water and dried. They were purified by recrystallization from 400 ml. of n-heptane (1 gram of charcoal being used for clarification); 23.5 grams of product were obtained.

|  | Found for Product | Calculated for $C_{28}H_{40}O_6$ |
| --- | --- | --- |
| C:% | 71.0, 71.3 | 71.2 |
| H:% | 7.9, 8.2 | 8.5 |
| Molecular weight | 450 | 472 |
| Melting point: | 132–4°C. (aluminum block) | |
| Infrared spectrum: no OH band | | |
| Ultraviolet spectrum: | | |
| Cyclohexane: | 278 mu | $\epsilon$ = 5,000 |
| | 282 mu | $\epsilon$ = 5,000 |
| | 285.5 mu | $\epsilon$ = 3,900 (just a hump) |
| Methanol: | 278 mu | $\epsilon$ = 5,800 |
| NMR spectrum: consistent with proposed structure. | | |

C. Preparation of 8,9,17,19-bis(x-hydroxy-sulfonylbenzo)-1,4,7,10,13,16-hexaoxacyclooctadeca-8,17-diene $C_{20}H_{24}O_{12}S_2$ Mol. Wt. 520

In a 500-ml. round-bottom flask were mixed 145 ml. of glacial acetic acid, 20 ml. of acetic anhydride, 4.5 grams (0.046 gram-mole) of sulfuric acid, and a solution of 8.7 grams (0.024 gram-mole) of 8,9,17,18-dibenzo-1,4,7,10,13,16-hexaoxacyclooctadeca-8,17-diene in 100 ml. of chloroform. The resulting charge was warmed to 40° C. and allowed to stand overnight at room temperature. After 1 gram of charcoal had been added, the mixture was brought to boil on a steambath and filtered through fine paper. Ten grams of product (as the dihydrate) were obtained in crystalline form by evaporating the solution to dryness heating at 0.5 mm. Hg.

|  | Found for Product | Calculated for $C_{20}H_{24}O_{12}S_2 \cdot 2H_2O$ |
| --- | --- | --- |
| C:% | 42.5, 42.5 | 43.0 |
| H:% | 5.6, 5.6 | 5.0 |
| S:% | 11.7, 11.8 | 11.5 |
| Melting point: | darkens at 139°C. | (aluminum block) |
| Infrared spectrum: OH and $SO_3H$ bands | | |
| Ultraviolet spectrum: | | |
| Water: | 278 mu | $\epsilon$ = 6,600 |
| | 284 mu | $\epsilon$ = 6,200 |
| Methanol: | 279.5 mu | $\epsilon$ = 5,900 |
| | 285 mu | $\epsilon$ = 5,300 (shoulder) |

The diammonium salt of the above compound was prepared and recovered as the dihydrate by reacting the acid with excess of ammonium hydroxide and evaporating to dryness.

D. Preparation of 8,9,17,18-bis(x-nitrobenzo)-1,4,7,10,13,16-hexaoxacyclooctadeca-8,17-diene $C_{20}H_{22}N_2O_{10}$ Mol. Wt. 450

A one-liter flask was charged with 150 ml. of chloroform containing 11 grams (0.03 gram-mole) of 8,9,17,18-dibenzo-1,4,7,10,13,16-hexaoxacyclooctadeca-8,17-diene; and 20 grams of an equivolume mixture of water and concentrated nitric acid (sp. gr. 1.421). The resulting composition was stirred vigorously for 1 hour at 25° C. The temperature was then raised gradually and the charge was refluxed at atmospheric pressure for 51 minutes; during this time the pot temperature rose from 55° to 59° C.

After 100 ml. of water and 25 ml. of chloroform had been added, the agitated charge was cooled to room temperature. The lower chloroform layer was separated, filtered through fine paper and evaporated to dryness by heating at 0.5 mm. Hg pressure. The product, 8.8 grams, was obtained as a light yellow solid.

|  | Found for Product | Calculated for $C_{20}H_{22}N_2O_{10}$ |
| --- | --- | --- |
| C:% | 53.4, 53.5 | 53.3 |
| H:% | 5.2, 5.2 | 4.9 |
| N:% | 6.1, 6.1 | 6.2 |
| Melting range: | 177–236°C. (aluminum block) | |
| Ultraviolet spectrum: | | |
| Chloroform: | 302 mu | $\epsilon$ = 8,000 |
| | 340.5 mu | $\epsilon$ = 11,500 |

E. Preparation of formaldehyde resin of 2,3,11,12-dibenzo-1,4,7,10,13,16-hexaoxacyclooctadeca-2,11-diene One hundred milliliters of glacial acetic acid, 2.4 grams of paraformaldehyde (equivalent to 0.08 gram-mole of formaldehyde) and 2.1 ml. of concentrated sulfuric acid (sp. gr. 1.84) were warmed at atmospheric pressure at 60° C. until most of the white crystals had dissolved, the excess being removed by filtration through coarse paper. Three and six-tenth grams (0.01 gram-mole) of 8,9,17,18-dibenzo- 1,4,10,13,16-hexaoxacyclooctadeca-8,17-diene were dissolved in 200 ml. of chloroform and mixed with the first solution. White solid precipitated at once. The charge was warmed to 50° C. and allowed to stand at room temperature (25°–30° C.) over the weekend.

The spongy solids obtained were filtered, warmed in the presence of a mixture of 50 ml. of water, 50 ml. of methanol and 10 ml. of concentrated ammonium hydroxide (sp. gr. 0.9), filtered, washed with 100 ml. of methanol and dried at 40° C. in a vacuum oven. Four and four-tenths grams of light brown, spongy, friable resin were obtained.

It was insoluble in water, methanol, acetone, chloroform or benzene. Analysis: %C 64.2, 64.5; %H: 6.2, 6.4; %S: 0.3 (indicating that some sulfonation of the aromatic ring had occurred).

F. Preparation of 2,3,11,12-bis(2',3'-naptho)-1,4,7,10,13,16-hexaoxacyclooctadeca12,11-diene; $C_{28}H_{28}O_6$ Mol. Wt. 460

A 3-liter round-bottom flask equipped with a thermometer, a reflux condenser, and agitator, was charged with 160 grams (1 gram-mole) of 2,3-dihydroxynaphthalene, 1 liter of water, 100 ml. of n-butanol, 80 grams (2 gram-moles) of sodium hydroxide and 143 grams (1 gram-mole) of bis(beta-chloroethyl) ether. The charge was refluxed at atmospheric pressure under nitrogen, while vigorously agitated, for 23 hours at a pot temperature of 96°–97° C.

The total charge was then evaporated to dryness and the residue extracted with 1 liter of chloroform; the extract was successively washed three times with 200 ml. of 5% aqueous sodium hydroxide, dried over 50 grams of anhydrous sodium sulfate, filtered through fine paper and evaporated to dryness at 40° C. at 0.5 mm. Hg. pressure. The resulting product consisted of 157 grams of friable resin of 90 percent purity. Pure product was obtained by crystallization of this resin from boiling n-heptane.

| | Found for Product | Calculated for $C_{28}H_{28}O_6$ |
|---|---|---|
| C:% | 72.2, 72.3 | 73.0 |
| H:% | 6.2, 6.2 | 6.1 |
| Molecular weight: no suitable solvent | | |
| Melting point of a sublimed sample: | | 244–6°C. (aluminum block) |
| Infrared spectrum: | | |
| Chloroform: | 310 mu | ← = 4,700 |
| | 316.5 mu | ← = 3,800 |
| | 324 mu | ← = 7,600 |

G. Preparation of 2,5,8,15,18,21-hexaoxatricyclo [20.4.0.0⁹·¹⁴] hexacosane $C_{20}H_{36}O_6$ Mol. Wt. 372

A 1-liter stainless steel shaker bomb was charged at 25° C. with 650 ml. of p-dioxane, 60 g. of 2,3,11,12-dibenzo-1,4,7,10,13,16-hexaoxacyclooctadeca-2,11-diene, prepared in accordance with the procedure of Part A(2), and 5 g. of ruthenium dioxide catalyst. After the bomb had been closed and readied for hydrogenation, the internal temperature was raised to 100° C. and the charge was hydrogenated while shaken at 1,550 lbs./sq.in. (gauge) for 5 hours. The bomb was then cooled and discharged.

The catalyst was removed by filtration. To keep it from heating up while air was being drawn through it, the catalyst was kept wet with water. Concentration of the filtrate in a rotary evaporator (0.5 mm. Hg. at 60° C.) gave 59 grams of colorless, viscous residue. This material was passed through a 4.8 × 25 cm. column of acid-washed alumina that had been prepared with petroleum ether (boiling point 60° C./760 mm. Hg.), and eluted with 860 ml. of n-heptane. When concentrated by evaporation, the eluate yielded 41.3 g. of 2,5,8,15,18,21-hexaoxatricyclo [20.4.0.0⁹·¹⁴] hexacosane as a colorless, very viscous oil. Yield: 66.7 percent. This oil can be made to solidify overnight at room temperature if a trace of the crystalline material itself is added.

Analytically pure compound was obtained by dissolving 6.2 g. in 25 ml. of methanol, adding 75 ml. of water at 25° C., and keeping the mixture cool in an ice-bath. The crystals that separated were filtered, washed with water, and dried in a vacuum oven at 40° C. Soft white crystals, weighing 2.3 g., were recovered.

| | Found for Product | Calculated for $C_{20}H_{36}O_6$ |
|---|---|---|
| C:% | 64.4, 64.5 | 64.5 |
| H:% | 9.6, 9.7 | 9.7 |
| Molecular Weight: | 378 | |
| Melting Point: | 68.5–69.5°C. | (aluminum block) |
| Infrared spectrum: no OH band | | |
| Ultraviolet spectrum: no absorption above 220 mu | | |
| NMR: consistent with proposed structure. | | |

EXAMPLE 5

Preparation of 2,3,8,9-dibenzo-1,4,7,10,13,16-hexaoxacycloocatadeca-2,8-diene $C_{20}H_{24}O_6$ Mol. Wt. 360

A 1-liter round-bottom flask equipped with a thermometer, a reflux condenser, and an agitator, was charged with 10 grams (0.041 gram-mole) of 1,2-bis(o-hydroxyphenoxy) ethane, 110 ml. of water, 30 ml. of n-butanol, 3.25 grams (0.081 gram-mole) of sodium hydroxide, 30 grams of sodium chloride and 7.6 grams (0.041 gram-mole) of 1,2-bis(beta-chloroethoxy) ethane. The charge was refluxed at atmospheric pressure while vigorously agitated under nitrogen for 22 hours and 45 minutes; during this time the pot temperature rose from 99° to 100° C.

After the entire charge had been conducted to dryness at 0.5 mm. Hg pressure, the residue was extracted with 300 ml. of chloroform; the extract was successively treated with 1 gram of charcoal, filtered through fine paper and evaporated to dryness by heating at 0.5 mm. The resulting brown residue, weighing 13.1 grams was extracted with 500 ml. of n-heptane. Concentration of this extract gave 6.4 grams of residue from which 3.7 grams of white crystals were obtained after an alcohol wash.

| | Found for Product | Calculated for $C_{20}H_{24}O_6$ |
|---|---|---|
| C:% | 66.4, 66.5 | 66.6 |
| H:% | 6.9, 7.0 | 6.7 |
| Molecular weight | 360 | 360 |
| Melting point: | 117–8°C. (aluminum block) | |
| Infrared spectrum: no OH band | | |
| Ultraviolet spectrum: | | |
| Cyclohexane: | 274.5 mu | ← = 4,400 |
| | 279.5 mu | ← = 4,300 |
| Methanol: | 275 mu | ← = 4,900 |
| NMR spectrum: consistent with proposed structure. | | |

EXAMPLE 6

Preparation of 2,3-benzo-1,4,7,10-tetraoxacyclododeca-2-ene and 2,3,14,15-dibenzo-1,4,7,10,13,16,19,22-octaoxacyclotetracosa-2,14-diene $C_{12}H_{16}O_4$ Mol. Wt. 224; $C_{24}H_{32}O_8$ Mol. Wt. 448

A 2-liter round-bottom flask equipped with a thermometer, a reflux condenser, and an agitator, was charged at 26° C. with 55 grams (0.5 gram-mole) of catechol, 400 ml. of water, 120 ml. of n-butanol, 40 grams (1 gram-mole) of sodium hydroxide and 93.5 grams (0.5 gram-mole) of 1,2-bis (beta-chloroethoxy) ethane. For 20 hours and 37 minutes, the charge was vigorously agitated at 96°–96.5° C. at atmospheric pressure under nitrogen.

Concentration of the reaction mixture at 0.5 mm. Hg. pressure gave a residue weighing 101.7 grams. This material was extracted at 26° C. with 500 ml. of benzene, the extract subsequently being treated with 1 gram of charcoal, filtered through fine paper and evaporated to dryness at 0.5 mm. The resulting residue, weighing 88.8 grams, was distilled in a rotary evaporator. The first fraction, 16.5 grams, boiling up to 100° C. at 0.4 mm., contained $C_{12}H_{16}O_4$, and the second fraction, 10.5 grams, boiling above 100° C. at 0.4 mm., contained $C_{24}H_{32}O_8$.

FIRST FRACTION

A solution of the first fraction in 200 ml. of benzene was washed twice with 100 ml. of 5 percent aqueous tetramethylammonium hydroxide, once with 100 ml. of 20 percent aqueous ammonium chloride, filtered through fine paper and evaporated to dryness at 0.5 mm. The residue weighing 10.2 grams was distilled twice by heating at 0.4 mm. pressure to give 7.4 grams of viscous liquid which solidified on standing at room temperature. Six grams of this product were boiled in a mixture of 60 ml. of methanol and 75 ml. of water containing 1 gram of charcoal, and filtered. When the methanol had been removed by heating on a steam-bath, an oil settled which crystallized into flat plates when ice cooling was applied. The crystals were filtered, washed with cold water and pumped dry at room temperature.

|  | Found for Product | Calculated for $C_{12}H_{16}O_4$ |
|---|---|---|
| C:% | 62.1, 62.1 | 64.3 |
| H:% | 7.0, 7.1 | 7.1 |
| Molecular weight | 211 | 224 |
| Melting point: | 37–9°C. (aluminum block) | |
| Infrared spectrum: no OH band | | |
| Ultraviolet spectrum: | | |
| Cyclohexane: | 274.5 mu ← = 1,800 | |
| | 280.5 mu ← = 1,600 | |
| Methanol: | 273.5 mu ← = 1,800 | |
| | 277.5 mu ← = 1,700 (just a hump) | |
| NMR spectrum: consistent with proposed structure | | |

SECOND FRACTION

The solid was washed with cold methanol and dried. The resulting 3 grams of white crystalline solid was nearly pure $C_{24}H_{32}O_8$. Pure product was obtained by heating at 0.4 mm., and washing the distillate with cold methanol (2.2 grams).

|  | Found for Product | Calculated for $C_{24}H_{32}O_8$ |
|---|---|---|
| C:% | 64.3, 64.4 | 64.3 |
| H:% | 6.9, 6.9 | 7.1 |
| Molecular weight | 453 | 448 |
| Melting point: | 113–4°C. (aluminum block) | |
| Infrared spectrum: | | |

| Cyclohexane: | 275 mu | ← = 4,350 |
|---|---|---|
| | 297 mu | ← = 4,400 |
| | 283 mu | ← = 3,200 (just a hump) |
| Methanol: | 275–278.5 mu | ← = 3,700–4,800 |

EXAMPLE 7

A. Preparation of 2,3,17,18-dibenzo-1,4,7,10,13,16,19,22,25,28decaoxacyclotriaconta-2,17-diene and 2,3-benzo-1,4,7,10,13-pentaoxacyclopentadeca-2-ene $C_{28}H_{40}O_{10}$ Mol Wt. 536 and $C_{14}H_{20}O_5$ Mol. Wt. 268 respectively A 5-liter round-bottom flask, equipped with a thermometer, a reflux condenser, dropping funnel and an agitator, and continuously covered with nitrogen was charged with 220 g. (2 moles) of catechol, 1,660 ml. of n-butanol, 132 g. (2 moles) of 85 percent potassium hydroxide and brought to reflux (pot temperature 107° C.). At this temperature 231 g. (1 mole) of 1,11-dichloro-3,6,9-trioxaundecane were added dropwise in 2.5 hours. The charge was cooled to 90° C., 132 g. (2 moles) of 85 percent potassium hydroxide were added and the pot temperature raised to 109° C. At this temperature 231 g. (1 mole) of the dichloroether named above were added dropwise in 2 hours and reflux continued for 16 hours which time the pot temperature dropped to 101° C. There was then removed by distillation 1,270 ml. of volatiles and 25 ml. concentrated hydrochloric acid were then added in 150 ml. of water. The residue was taken up in a liter of chloroform and washed 3 times with 250 ml. of 5 percent aqueous sodium hydroxide saturated with sodium chloride. The chloroform layer was dried with anhydrous sodium sulfate, filtered and stripped in a vacuum rotary evaporator. The residue, 525.3 g. of brown solids, was treated in a continuous extractor with n-heptane. The first crop of crystals, 31.8 g., was the desired compound.

|  | Found for Product | Calculated for $C_{28}H_{40}O_{10}$ |
|---|---|---|
| C:% | 62.6, 62.8 | 62.7 |
| H:% | 7.5, 7.5 | 7.5 |
| Molecular weight | 539 | 536 |
| Melting point: | 106–107.5°C. | |
| Infrared spectrum: no OH band | | |
| Ultraviolet spectrum: | | |
| Methanol: 276 mu ← = 4,700 | | |

On continuing the n-heptane extraction, 242.4 g. of nearly white crystals were obtained. This product was a mixture of the desired compound and 2,3-benzo-1,4,7,10,13-pentaoxacyclopentadeca-2-ene, $C_{14}H_{20}O_5$, molecular weight 268. No attempt was made to quantitatively separate the two compounds, but some of the lower molecular weight product was separated and purified for analysis.

|  | Found for Product | Calculated for $C_{14}H_{20}O_5$ |
|---|---|---|
| C:% | 63.2 | 62.7 |
| H:% | 7.6 | 7.5 |
| Molecular weight | 278 | 268 |
| Melting point: 77–78°C. | | |
| Infrared spectrum: no OH band | | |

Ultraviolet spectrum:
   Methanol: 275 mu ← = 2,500

B. Preparation of 2,5,8,11,14,21,24,27,30,33-decaoxatricyclo [32.4.0.015.20]-octatriacontane $C_{28}H_{52}O_{10}$ Mol. Wt. 548

A 500-ml. stainless steel shaker bomb was charged with 30 g. (0.056 mole) of 2,3,17,18-dibenzo-1,4,7,10,13,16,19,22,25,28decaoxacyclotriaconta-2,17-diene, 250 ml. of p-dioxane and 2.5 g. of ruthenium dioxide. The bomb was readied for hydrogenation and the charge was hydrogenated at 100° C., 1,600 psig hydrogen pressure for 15 hours with good agitation.

The reaction mixture was filtered and stripped in a vacuum rotary evaporator at 100° C. and 0.3 mm. The colorless, viscous residue (30.8 g.) was placed on a 9 × 1.75-inch column of alumina and eluted with 800 ml. of petroleum ether and 500 ml. of benzene. From the eluates 18.6 g. of the desired product, as a colorless oil, were recovered. Yield: 60.6 percent.

|  | Found for Product | Calculated for $C_{28}H_{52}O_{10}$ |
| --- | --- | --- |
| C:% | 61.1, 61.4 | 61.3 |
| H:% | 9.6, 9.7 | 9.5 |
| Molecular weight | 520 | 548 |
| Infrared spectrum: no OH band | | |
| NMR spectrum: consistent with proposed structure. | | |

EXAMPLE 8

A. Preparation of 2,3,20,21-dibenzo-1,4,7,10,13,16,19,22,25,28,31,34,37,40,43,46-hexadecaoxacyclooctatetraconta-2,20-diene $C_{40}H_{64}O_{16}$ Mol. Wt. 800

A liter round-bottom flask, equipped with a thermometer, a reflux condenser and an agitator, and continuously covered with nitrogen was charged with 61.7 g. (0.1 mole) of 1,26-bis(o-hydroxyphenoxy)-3,6,9,12,15,18,21,24-octaoxahexacosane, 250 ml. of n-butanol, 13.6 g. (0.2 mole) of 85 percent potassium hydroxide and brought to reflux (pot temperature 113° C.). At this temperature added dropwise 28.4 g. (0.1 mole) of 1,14-dichloro-3,6,9,12-tetraoxatetradecane dissolved in 80 ml. of n-butanol and refluxed for 23 hours. The charge was cooled, filtered and stripped in a vacuum rotary evaporator (100° C. down to 0.3 mm.). The brown viscous oil, 83.3 g. was dissolved in 100 ml. of chloroform, placed on an 8 × 1.75-inch column of alumina and eluted with chloroform. The crude product, 57.0 g., was recovered from the eluate. Its infrared spectrum showed no OH band and the analytical results were: C: percent found 59.4, 59.5; calc. 60.0 H: percent found 8.1, 8.2; calc. 8.0.

The ultraviolet spectrum, however, showed that the crude product was contaminated with phenolics. It was placed on a 9 × 1.75-inch column of alumina and eluted with 150 ml. of benzene. The OH-free product weighed 26.4 g. Yield: 33 percent.

|  | Found for Product | Calculated for $C_{40}H_{64}O_{16}$ |
| --- | --- | --- |
| C:% | 59.6 | 60.0 |
| H:% | 8.3 | 8.0 |
| Molecular weight | 725 | 800 |
| Infrared spectrum: no OH band | | |
| Ultraviolet spectrum: Methanol: 275 mu = 4,300 | | |
| NMR spectrum: consistent with proposed structure. | | |

B. Preparation of 2,5,8,11,14,17,24,27,30,33,36,39,42,45,48,51-hexadecaoxatricyclo [50.5.0$^{18,23}$]hexapentacontane $C_{40}H_{76}O_{16}$ Mol. Wt. 812

A 400-ml. stainless steel shaker bomb was charged with 10.9 g. (0.0136 mole) of 2,3,20,21-dibenzo--dibenzo-1,4,7,10,13,16,19,22,25,31,34,37,40,43,46 - hexadecaoxacyclooctatetraconta-2,20-diene, 100 ml. of p-dioxane and 1.0 g. of ruthenium dioxide. The bomb was readied for hydrogenation and the charge was hydrogenated at 100° C., 1,600 psig hydrogen pressure for 10 hours with good agitation.

The reaction mixture was filtered and stripped in a vacuum rotary evaporator at 100° C. and 0.3 mm. The colorless, viscous oil (10.3 g.) was placed on a 5 × 1.75-inch column of alumina and eluted with 70 ml. of benzene. From the eluate 6.4 g. of the desired product, as a colorless oil, were recovered. Yield: 58 percent.

|  | Found for Product | Calculated for $C_{40}H_{76}O_{16}$ |
| --- | --- | --- |
| C:% | 58.7, 59.0 | 59.1 |
| H:% | 9.4, 9.5 | 9.4 |
| Infrared spectrum: no OH band | | |
| NMR spectrum: consistent with proposed structure. | | |

EXAMPLE 9

Preparation of 2,3,8,9,14,15-tribenzo-1,4,7,10,13,16-hexaoxacyclooctadeca-2,8,14-triene $C_{24}H_{24}O_6$ Mol. Wt. 408

A 500-ml. round-bottom flask equipped with a thermometer, a Reflux condenser, and an agitator, was charged with 8.25 g. (0.0335 gram-mole) of 1,2-bis(o-hydroxyphenoxy) ethane, 60 ml. of n-butanol, 2.7 g. (0.0675 gram-mole) of sodium hydroxide in 20 ml. of water and 7.9 g. (0.0335 gram-mole) of o-bis(beta-chloroethoxy) benzene. The charge was refluxed under nitrogen, while vigorously agitated, for 19 hours during which time the pot temperature rose From 96° to 96.5° C.

The charge separated into two layers on cooling, the lower aqueous layer was discarded, and the upper layer was evaporated to dryness and extracted with 250 ml. of chloroform. The extract was washed twice with 100 ml. of 5 percent aqueous sodium hydroxide, dried with sodium sulfate, and evaporated to dryness. The brown solid residue (8.6 g.) contained about 4.9 g. of the product. Shiny white crystals (2.1 g.) were obtained by recrystallizing 3.8 g. from 85 ml. of benzene.

|  | Found for Product | Calculated for $C_{24}H_{24}O_6$ |
| --- | --- | --- |
| C:% | 70.8, 71.0 | 70.6 |
| H:% | 5.7, 6.0 | 5.9 |
| Molecular weight: | No satisfactory solvent | |
| Melting point: | 192-3°C. (aluminum block) | |
| Infrared spectrum: No OH band | | |

Ultraviolet spectrum:  Methanol 275 mu ← = 7,200
NMR: consistent  with proposed structure.

EXAMPLE 10

Preparation of 2,3,9,10-dibenzo-1,4,8,11,14,17-hexaoxacyclononadeca-2,9-diene $C_{21}H_{26}O_6$ Mol. Wt. 374

A 1-liter round-bottom flask equipped with a thermometer, a reflux condenser, and an agitator, was charged with 36.1 g. (0.108 gram-mole) of triethylene glycol bis-(o-hydroxyphenyl) ether, 300 ml. of n-butanol, 8.6 g. (0.215 gram-mole) of sodium hydroxide in 30 ml. of water, and 21.8 g. (0.108 gram-mole) of 1,3-dibromopropane. The charge was refluxed under nitrogen, while vigorously agitated, for 21 hours during which time the pot temperature rose from 101° to 102.5°C.

The entire charge was evaporated to dryness under vacuum and the residue (60.6 g.) was extracted with 250 ml. of chloroform. The extract was washed three times with 50 ml. of 5 percent aqueous sodium hydroxide, was filtered, and evaporated to dryness. A brown oil (33.4 g.) was obtained and was distilled at 0.4 mm. in a rotary evaporator. A first fraction, weighing 8.2 grams, of yellow liquid was discarded. The second fraction (18.8 g.) was dissolved in 100 ml. of chloroform, washed twice with 50 ml. of 5 percent aqueous sodium hydroxide, filtered and dried under vacuum. The brown liquid residue (15.5 g.) crystallized on standing at room temperature. The slurry of crystals was placed on a porous plate and left at room temperature for seven days. The white crystalline product weighed 6.3 g. The pure compound was obtained by recrystallizing from n-heptane.

|  | Found for Product | Calculated for $C_{21}H_{26}O_6$ |
|---|---|---|
| C:% | 66.9, 67.0 | 67.4 |
| H:% | 6.9, 6.9 | 7.0 |
| Molecular weight | 387 | 374 |
| Melting Point: | 84.5–6 C. (aluminum block) | |
| Infrared spectrum: no OH band | | |
| NMR: CONSISTENT with proposed structure. | | |
| Ultraviolet spectrum: | Methanol 274 mu ← = 4,400 | |

EXAMPLE 11

Preparation of 2,3,8,9,14,15-tribenzo-1,4,7,10,13,16-hexaoxacyclononadeca-2,8,14-triene $C_{25}H_{26}O_6$ Mol. Wt. 422

A 500-ml. round-bottom flask was charged with 8.7 g. (0.0335 gram-mole) of 1,3-bis(o-hydroxyphenoxy)propane, 80 ml. of n-butanol, 2.7 g. (0.0675 gram-mole) of sodium hydroxide in 20 ml. of water, and 7.9 g. (0.0335 gram-mole) of o-bis(beta-chloroethoxy)benzene. The charge was refluxed under nitrogen, while vigorously agitated, for 23 hours during which time the pot temperature rose from 96.5° TO 97.5°C.

The entire charge was evaporated to dryness under vacuum and the residue (18 g.) extracted with 250 ml. of chloroform. The extract was washed twice with 50 ml. of 5 percent aqueous sodium hydroxide, once with 100 ml. of water, dried with 5 g. of sodium sulfate, and filtered after the addition of 1 g. of clarifying charcoal. The residue (10.4 g.) obtained by evaporation was slurried with 40 ml. of acetone, filtered, washed with 30 ml. of acetone and dried. The white crystalline product weighed 2.3 g. Pure crystals were obtained by adding petroleum ether to a warm benzene solution.

|  | Found for Product | Calculated for $C_{25}H_{26}O_6$ |
|---|---|---|
| C:% | 70.8, 71.1 | 71.1 |
| H:% | 6.2, 6.2 | 6.2 |
| Molecular weight | 418 | 422 |
| Melting point: | 417–9°C. (aluminum block) | |
| Infrared spectrum: no OH band | | |
| NMR: consistent with proposed structure | | |
| Ultraviolet spectrum: | Methanol 274.5 mu ← = 6,500 | |

EXAMPLE 12

A. Preparation of 2,3-benzo-1,4,7,10,13-pentaoxacyclopentadeca-2-ene $C_{14}H_{20}O_5$ Mol. Wt. 268

A 1-liter round-bottom flask equipped with a thermometer, a reflux condenser, and an agitator, was charged with 22 g. (0.2 gram-mole) of catechol, 400 ml. of n-butanol, 17 g. (0.425 gram-mole) of sodium hydroxide in 20 ml. of water, and 46.2 g. (0.2 gram-mole) of 1,11-dichloro-3,6,9-trioxaundecane. The charge was refluxed under nitrogen, while vigorously agitated, for 21 hours during which time the pot temperature dropped from 106° to 101°C.

Carbon dioxide gas was passed through the alkaline charge for 30 minutes and the charge was evaporated to dryness in a rotary vacuum evaporator at 60°C. The residue was extracted with 200 ml. of chloroform and the resultant extract was washed with 400 ml. of water, filtered, and evaporated to dryness. The brown, viscous, oily residue (39.3 g.) contained 31.7 g. of the desired product. The pure compound was obtained by crystallization from n-heptane (shiny white flakes).

|  | Found for Product | Calculated for $C_{14}H_{20}O_5$ |
|---|---|---|
| C:% | 62.1, 62.3 | 62.7 |
| H:% | 7.4, 7.5 | 7.5 |
| Molecular weight | 278 | 268 |
| Melting point: | 79–81°C. (aluminum block) | |
| Infrared spectrum: no OH band | | |
| Ultraviolet spectrum: | Methanol 274 mu ← = 2,300 | |
|  | 277.5 mu ← = 2,300 | |

B. Preparation of 2,5,8,11,14-pentaoxabicyclo [13.4.0] nonadecane $C_{14}H_{26}O_5$ Mol. Wt. 274

A 400-ml. stainless steel shaker bomb was charged at 25°C. with 180 ml. of p-dioxane, 26 g. (0.097 gram-mole) of 2,3-benzo-1,4,7,10,13-pentaoxacyclopentadeca-2-ene, prepared in accordance with the procedure of Part A, and 1.5 g. of ruthenium dioxide catalyst. After the bomb had been closed, the charge was hydrogenated while shaken at 90°C. and 1,600 lbs./sq.in. (gauge) for 3 hours. The bomb was then discharged after cooling.

After the catalyst had been filtered off, the filtrate was concentrated in a rotary vacuum evaporator at 60° C. and 0.5 mm. Hg. The viscous residue weighing 25.1 g. was put on a 4.8 × 25-cm. column of acid-washed alumina and eluted with 400 ml. of petroleum ether (boiling point: 60° C./769 mm. Hg.) and 400 ml. of benzene in turn. The combined eluates were concentrated in a rotary vacuum evaporator at 100° C. and 0.5 mm. Hg. to give 2,5,8,11,14-pentaoxabicyclo[13.4.0]nonadecane as a colorless, viscous oil weighing 15.3 g. Yield: 57.5 percent.

|  | Found for Product | Calculated for $C_{14}H_{26}O_5$ |
|---|---|---|
| C:% | 60.7, 60.9 | 61.3 |
| H:% | 9.3, 9.4 | 9.5 |
| Molecular weight | 262 | 274 |
| Infrared spectrum: no OH band | | |
| Ultraviolet spectrum: | no absorption above 220 mu. | |

C. Preparation of 2,3-(4' and/or 5'-tert-butyl-benzo)-1,4,7,10,13-pentaoxacyclopentadeca-2-ene $C_{18}H_{28}O_5$ Mol. Wt. 324

A 2-liter round-bottom flask equipped with a thermometer, a reflux condenser, and an agitator, was charged with 33.2 g. (0.2 gram-mole) of 4-tert-butyl-catechol, 700 ml. of n-butanol, 17 g. (0.425 gram-mole) of sodium hydroxide in 40 ml. of water, and 46.2 g. (0.2 gram-mole) of 1,11-dichloro-3,6,9-trioxaundecane. The charge was refluxed under nitrogen, while vigorously agitated, for 17 hours during which time the pot temperature dropped from 103.5° to 100° C.

The charge was filtered and evaporated to dryness in a rotary vacuum evaporator at 60° C. The residue (71.2 g.) was extracted with 300 ml. of benzene and the resultant extract was washed 4 times with 100 ml. of 5 percent aqueous sodium hydroxide, filtered, and evaporated to dryness. The residue (60.8 g.) was distilled from a rotary evaporator at 0.45 mm. The oily distillate (43.3 g.) contained 91 percent by weight of the desired product. The pure product was obtained by formation of a complex with potassium thiocyanate in methanol, decomposed with water, extracted with chloroform and distilled from a rotary evaporator at 0.45 mm.

|  | Found for Product | Calculated for $C_{18}H_{28}O_5$ |
|---|---|---|
| C:% | 66.8, 67.0 | 66.7 |
| H:% | 8.5, 8.6 | 8.6 |
| Molecular weight | 328 | 324 |
| Infrared spectrum: no OH band | | |
| Ultraviolet spectrum: | Methanol 278 mu ← = 2,700 | |

D. Preparation of 17-tert-butyl-2,5,8,11,14-pentaoxabicyclo[13.4.0]nonadecane $C_{18}H_{34}O_5$ Mol. Wt. 330

A 1-liter stainless steel shaker bomb was charged with 450 ml. of p-dioxane, 53 g. (0.164 gram-mole) of 2,3-(4'-tert-butylbenzo)-1,4,7,10,13-pentaoxacyclopentadeca-2-ene prepared in accordance with the procedure of Part C, and 20 g. of 5 percent ruthenium on carbon. Hydrogenation was subsequently carried out for 19 hours while the bomb was shaken at 100° C. under a pressure of 1,600 psi. (gauge).

After the contents of the bomb had been cooled to 25° C., they were removed and filtered. The catalyst-free filtrate was then concentrated in a rotary evaporator at 60° C. and 0.5 mm. Hg. The viscous residue obtained, weighing 48.1 g., was twice chromatographed on acid-washed alumina using n-heptane. The eluate, 11.7 g. of oil, was still contaminated with compounds containing a hydroxyl group. Eleven grams of this product were treated at 80° C. with 1 ml. of 2,4-toluene diisocyanate and 3 drops of triethylamine, warmed on a steambath, and then allowed to stand at 25° C. overnight. Five milliliters of water were added and the mixture stored for 2 days at 25° C. The resulting mixture was then dried in a rotary evaporator, taken up with 200 ml. of n-heptane, filtered to remove insoluble matter and the filtrate was concentrated in a rotary evaporator at 60° C. and 0.5 mm. Hg. The residue, 9.3 g. of nearly colorless oil, was the desired product 17-tert-butyl-2,5,8,11,14-pentaoxabicyclo[13.4.0]nonadecane. Yield: 17 percent. A portion was distilled at 0.8 mm. Hg and ca. 200° C. to obtain an analytical sample.

|  | Found for Product | Calculated for $C_{18}H_{34}O_5$ |
|---|---|---|
| C:% | 64.9, 65.0 | 65.5 |
| H:% | 10.3, 10.4 | 10.3 |
| Molecular weight | 320 | 330 |
| Infrared spectrum: no OH band | | |
| Ultraviolet spectrum: | no absorption above 220 mu. | |

EXAMPLE 13

Preparation of 2,3,8,9,14,15-tribenzo-1,4,7,10,13,16,19,22,-octaoxacyclotetracosa-2,8,14-triene $C_{28}H_{32}O_8$ A 1-liter round-bottom flask equipped with a thermometer, a reflux condenser, and an agitator, was charged with 16.7 g. (0.05 gram-mole) of 1,2-bis[beta-(o-hydroxyphenoxy)-ethane, 250 ml. of n-butanol, 4.0 g. (0.1 gram-mole) of sodium hydroxide dissolved in 10 ml. of water, and 11.8 g. (0.05 gram-mole) of 1,2-bis(beta-chloroethoxy)]benzene. The charge was refluxed under nitrogen, while vigorously agitated, for 23 hours during which time the pot temperature rose from 102° to 105° C.

The entire charge was dried in a vacuum rotary evaporator, and the residue (24.6 g.) was extracted with 200 ml. of chloroform. The extract was washed twice with 100 ml. of 5 percent aqueous sodium hydroxide, filtered and evaporated to dryness. The brown residue (21.6 g.) was distilled from vacuum rotary evaporator at 0.35 mm. The first fraction (1.8 g.) of low boilers was discarded. The second fraction weighing 10.8 g. was the desired product contaminated with a slight amount of an unknown impurity. The product was a viscous liquid which did not crystallize at room temperature even on long standing.

Calculated

| | Found for Product | for $C_{28}H_{32}O_6$ |
|---|---|---|
| C:% | 66.5, 66.6 | 67.7 |
| H:% | 6.5, 6.7 | 6.5 |
| Molecular weight | 496 | 465 |
| Infrared spectrum: no OH band | | |
| Ultraviolet spectrum: | Methanol 254 mu ← = 6,400 | |
| NMR: consistent with | proposed structure. | |

EXAMPLE 14

A. Preparation of 2,3-benzo-1,4,7,10,13,16-hexaoxacyclooctadeca-2-ene

A 500-ml. round-bottom flask equipped with a thermometer, a reflux condenser, and an agitator, was charged with 6 g. (0.0546 gram-mole) of catechol, 200 ml. of n-butanol, 4.4 g. (0.11 gram-mole) of sodium hydroxide in 10 ml. of water, and 15 g. (0.0546 gram-mole) of 1,4-dichloro-3,6,9,12-tetraoxatetradecane. The charge was refluxed under nitrogen, while vigorously agitated, for 6.25 hours during which time the pot temperature dropped from 104.5° to 102.5°C.

The charge was filtered hot and evaporated to dryness in a rotary vacuum evaporator at 60° C. The viscous, oily residue (18.5 g.) was extracted with 100 ml. of chloroform, and the resultant extract was washed twice with 50 ml. of 5 percent aqueous sodium hydroxide, dried with anhydrous sodium sulfate, and evaporated to dryness. The viscous, oily residue (12.5 g.) was distilled from a rotary evaporator at 0.45 mm. The nearly colorless, viscous distillate (9.9 g.) contained 58 percent by weight of the desired product. The pure compound was obtained through the potassium thiocyanate complex formed in methanol, decomposed with hot water, extracted with hot benzene and evaporated to dryness in a rotary evaporator at 0.45 mm. and 60° C.

| | Found for Product | Calculated for $C_{16}H_{24}O_6$ |
|---|---|---|
| C:% | 61.2, 61.3 | 61.5 |
| H:% | 7.5, 7.6 | 7.7 |
| Molecular weight | 319 | 312 |
| Melting point: 43–44°C. | | |
| Infrared spectrum: no OH band | | |
| Ultraviolet spectrum: | Methanol 275 mu ← = 2,100 | |

B. Preparation of 2,5,8,11,14,17-hexaoxabicyclo [16.4.0] docosane $C_{16}H_{30}O_6$ Mol. Wt. 318

A 500-ml. stainless steel shaker bomb was charged at 25° C. with 250 ml. of p-dioxane, 50.3 g. (0.161 grammole) of 2,3-benzo-1,4,7,10,13,16-hexaoxacyclooctadeca-2-ene prepared by the procedure of Part A and 3 g. of ruthenium dioxide catalyst. The bomb was sealed and the charge therein was subsequently hydrogenated at 100° C. and 1,600 lbs./sq.in. (gauge) for 13 hours while shaken. After being cooled to 25°C., the bomb was discharged and the catalyst filtered off.

The catalyst-free filtrate was concentrated in a rotary vacuum evaporator at 60° C. and 0.5 mm. Hg. The viscous residue weighing 44 g. was put on a 4.8 × 25 cm. column of acid-washed alumina and eluted with 500 ml. of n-hexane at 25°C. Evaporation of the eluate gave 24.5 g. of 2,5,8,11,14,17-hexaoxabicyclo[16.4.0]docosane as a colorless, viscous oil. Yield: 48.3 percent.

| | Found for Product | Calculated for $C_{16}H_{30}O_6$ |
|---|---|---|
| C:% | 60.3, 60.5 | 60.4 |
| H:% | 9.4, 9.5 | 9.4 |
| Molecular weight | 314 | 318 |
| Infrared spectrum: no OH band | | |
| Ultraviolet spectrum: | no absorption above 220 mu. | |

C. Preparation of 2,3-(4'-tert-butylbenzo)-1,4,7,10,13,16-hexaoxacyclooctadeca-2-ene $C_{20}H_{32}O_6$ Mol. Wt. 368

A 1-liter round-bottom flask equipped with a thermometer, a reflux condenser, and an agitator, was charged with 9 g. (0.0542 gram-mole) of 4-tert-butylcatechol, 200 ml. of n-butanol, 4.4 g. (0.11 gram-mole) of sodium hydroxide in 10 ml. of water, and 15 g. (0.0546 gram mole) of 1,14-dichloro-3,6,9,12-tetraoxatetradecane. The charge was refluxed under nitrogen, while vigorously agitated, for 23 hours during which time the pot temperature remained at 105°C.

The light orange solution was decanted from the solids and evaporated to dryness in a rotary vacuum evaporator. The residue (22.3 g.) was extracted with 200 ml. of chloroform, and the resultant extract was washed twice with 250 ml. of 1 percent aqueous sodium hydroxide, dried with anhydrous sodium sulfate, filtered, and evaporated to dryness. The residue (20.6 g.) was distilled from a rotary evaporator at 0.45 mm. The viscous oily distillate (17.3 g.) contained 71 percent by weight of the desired product. The pure product was obtained by conversion into the potassium thiocyanate complex, decomposition of the complex with water, extraction with chloroform, and finally by distillation under vacuum.

| | Found for Product | Calculated for $C_{20}H_{32}O_6$ |
|---|---|---|
| C:% | 65.1, 65.4 | 65.2 |
| H:% | 8.5, 8.7 | 8.7 |
| Molecular weight | 368 | 368 |
| Infrared spectrum: no OH band | | |
| Ultraviolet spectrum: | Methanol 278 mu ← = 2,700 | |

D. Preparation of 20-tert-butyl-2,5,8,11,14,17-hexaoxabicyclo[16.4.0]docosane $C_{20}H_{38}O_6$ Mol. Wt. 374

A one-liter stainless steel shaker bomb was charged at 25° C. with 600 ml. of p-dioxane, 81 g. (0.22 grammole) of 2,3-(4'-tert-butylbenzo)-1,4,7,10,13,16-hexaoxacyclooctadeca-2-ene, prepared by the method of Part C, and 30 g. of 5 percent ruthenium on carbon, and subsequently hydrogenated at 100° C., 1,600 lbs./sq.in. (gauge), while agitated for 11 hours.

After the bomb had been cooled to room temperature, the contents were removed and filtered to separate the catalyst. Concentration of the filtrate in a rotary evaporator at 60° C. at 0.5 mm. Hg gave a viscous residue weighing 62.8 g. After this material had been twice chromatographed as described in Example 2, the eluate weighing 16.8 g. was treated with 3 g. of phthalic anhydride and 2 drops of pyridine, warmed on a steambath for 2 hours, and allowed to stand at 25° C. overnight. The resulting mixture of crystals and viscous liquid was filtered to remove insoluble matter, the filtrate was diluted with 120 ml. of n-heptane and again filtered to remove insoluble matter. The filtrate was chromatographed on acid-washed alumina using n-heptane. Two hundred milliliters of eluate were collected and treated with 5 g. of dry magnesium oxide and 1 g. of clarifying charcoal, stirred for 1 hour, filtered, and the filtrate freed from volatiles in a rotary evaporator at 60° C. and 0.5 mm. Hg. The residue, 20-tert-butyl-2,5,8,11,14,17-hexaoxabicyclo [16.4.0] docosane, was a yellow oil weighing 10.2 g. The yield of desired product: 12.4 percent.

| | Found for Product | Calculated for $C_{20}H_{32}O_6$ |
|---|---|---|
| C:% | 64.3, 64.4 | 64.2 |
| H:% | 10.3, 10.6 | 10.2 |
| Molecular weight | 354 | 374 |
| Infrared spectrum: no OH band | | |
| Ultraviolet spectrum: | no absorption above 220 mu. | |

EXAMPLE 15

Preparation of 2,3,8,9,14,15,20,21-tetrabenzo-1,4,7,10,13,16,19,22-octaoxacyclotetracosa-2,8,14,20-tetraene $C_{32}H_{32}O_8$

FIRST METHOD

A 500-ml. round-bottom flask equipped with a thermometer, a reflux condenser, and an agitator, was charged with 17.1 g. (0.0448 gram-mole) of 1,2-bis-beta-(o-hydroxyphenoxy)ethoxy-benzene, 125 ml. of n-butanol, 3.6 g. (0.09 gram-mole) of sodium hydroxide in 15 ml. of water, and 10.5 g. (0.0447 gram-mole) of o-bis(beta-chloroethoxy) benzene. The charge was refluxed under nitrogen, while vigorously agitated, for 27 hours at 98°–99.5° C. pot temperature.

The entire charge was dried in a vacuum rotary evaporator and the residue (24.6 g.) was extracted with 250 ml. of chloroform. The extract was washed twice with 50 ml. of 5 percent aqueous sodium hydroxide, filtered and evaporated to dryness. The brown liquid residue (16.3 g.) solidified upon standing for 2 days at room temperature. It was slurried with 100 ml. of acetone, filtered and dried. The white solid product Weighed 4.59. The pure compound was obtained by recrystallizing from n-heptane containing about 10 percent by volume of benzene.

| | Found for Product | Calculated for $C_{32}H_{32}O_8$ |
|---|---|---|
| C:% | 70.8 | 70.6 |
| H:% | 6.4 | 5.9 |
| Molecular weight: | no suitable solvent | |
| Melting point: | 148–150°C. | |
| Infrared spectrum: no OH band | | |
| NMR: consistent with proposed structure | | |

SECOND METHOD

A 1-liter round-bottom flask equipped with a thermometer, a reflux condenser, and an agitator, was charged with 12.2 g. (0.111 gram-mole) of catechol, 250 ml. of n-butanol, 8.9 g. (0.222 gram-mole) of sodium hydroxide in 15 ml. of water, and 26.1 g. (0.111 gram-mole) of o-bis(beta-chloroethoxy) benzene. The charge was refluxed under nitrogen, while vigorously agitated, for 23 hours during which time the pot temperature dropped from 104.5° to 101.5° C.

The charge was decanted from solids and evaporated to dryness in a rotary vacuum evaporator at 60° C. The residue (34.9 g.) was dissolved with 300 ml. of chloroform and washed twice with 200 ml. of 5 percent aqueous sodium hydroxide, filtered, and evaporated to dryness. The semi-solid residue (21.9 g.) was distilled from a rotary evaporator at 0.45 mm. The distillate weighed 7.0 g. and the residue 14.0 g.

The distillate was triturated with 50 ml. of methanol and dried. The white crystals (4.4 g.) were found to be 2,3,8,9-dibenzo-1,4,7,10-tetraoxacyclododeca-2,8-diene. Found: C 70.2, 70.3%; H 5.7, 5.8%. Calculated for $C_{16}H_{16}O_4$: C 70.6%; H 5.9%. Melting point: 207°–211° C. Mixed melting point with authentic sample: 207°–9aL C.

The residue was triturated with 200 ml. of acetone, filtered and taken up with 200 ml. of chloroform. It was washed with 200 ml. of 5 percent aqueous sodium hydroxide, dried with anhydrous magnesium sulfate, treated with 1 g. of activated charcoal, filtered and evaporated to dryness. The product weighed 5.4 g. The pure compound was obtained by recrystallizing from n-heptane containing about 10 percent by volume of benzene.

| | Found for Product | Calculated for $C_{32}H_{32}O_8$ |
|---|---|---|
| C:% | 70.7, 70.8 | 70.6 |
| H:% | 5.8, 6.0 | 5.9 |
| Melting point: | 150–2°C. | |
| Infrared spectrum: no OH band | | |
| Ultraviolet spectrum: | Methanol 273 mu ← = 8,400 | |

EXAMPLE 16

Preparation of 2,3,32,33-dibenzo-1,4,7,10,13,16,19,22,25,28,31,34,37,40,43,46,49,52,55,58-eicosaoxacyclohexaconta-2,32-diene $C_{48}H_{80}O_{20}$ Mol. Wt. 976

A liter round-bottom flask, equipped with a thermometer, a reflux condenser and an agitator, and continuously covered with nitrogen was charged with 59.0 g. (0.1 mole) of 1,26-bis(o-hydroxyphenoxy)-3,6,9,12,15,18,21,24-octaoxahexacosane, 250 ml. of n-butanol, 13 g. (0.2 mole) of 85 percent potassium hydroxide and brought to reflux (pot temperature 113.5° C.). At this temperature added dropwise 44.4 g. (0.1 mole) of 1,26-dichloro-3,6,9,12,15,18,21,24-octaoxahexacosane dissolved in 60 ml. of n-butanol and refluxed for 28 hours (pot temperature 113.5 to 115.5° C.). The charge was cooled, filtered and stripped in a vacuum rotary evaporator (100° C. down to 0.3 mm.).

The brown viscous oil, 107.3 g. was dissolved in chloroform and chromatographed on a 9 × 1.75-inch column of alumina. The crude product, 79.0 g. of brown viscous oil, was recovered from the eluate. Its infrared spectrum showed very little OH. The analytical results were: C: percent found 58.3, 58.4; calc. 59.0; H: percent found 8.2, 8.4; calc. 8.2; mol. weight found 1,009; calc. 976.

The product was placed on a 9 × 1.75-inch column of alumina and eluted with benzene (ca. 150 ml.). The OH-free product weighed 38.6 g. Yield: 41.4 percent.

|  | Found for Product | Calculated for $C_{48}H_{80}O_{20}$ |
|---|---|---|
| C:% | 58.4 | 59.0 |
| H:% | 8.4 | 8.2 |
| Molecular weight | 916 | 976 |
| Infrared spectrum: no OH band | | |
| Ultraviolet spectrum: | Methanol 275 mu ← = 4,200 | |
| NMR spectrum: consistent | with proposed structure. | |

B. Preparation of 2,5,8,11,14,17,20,23,26,29,36,39,42,45,48,51,54,57,60,63 eicosaoxatricyclo [62.4.0.0$^{30.35}$]octahexacontane C H O Mol. Wt. 988

A 400-ml. stainless steel shaker bomb was charged with 14.4 g. (0.0148 mole) of 2,3,32,33-dibenzo-1,4,7,10,13,16,19,22,25,28,31,34,37,40,43,46,49,52,55,58-eicosaoxacyclohexaconta-2,32-diene, 150 ml. of p-dioxane and 2 g. of ruthenium dioxide. The bomb was readied for hydrogenation and the charge was hydrogenated at 100 C., 1,600 psig hydrogen pressure for 6 hours with good agitation.

The reaction mixture was filtered and stripped in a vacuum rotary evaporator at 100 C. and 0.3 mm. The nearly colorless, viscous oil (13.2 g.) was placed on a 5 1.75-inch column of alumina and eluted with 75 ml. of benzene. From the eluate 6.5 g. of the desired product, as a nearly colorless oil were recovered. Yield: 44.5 percent.

|  | Found for Product | Calculated for C H O |
|---|---|---|
| C:% | 57.3, 57.5 | 58.3 |
| H:% | 9.3, 9.4 | 9.3 |
| Infrared spectrum: no OH band | | |
| NMR spectrum: consistent | with proposed structure | |

EXAMPLE 17

Preparation of metal salt complexes of 2,5,8,15,18,21-hexaoxatricyclo [20.4.0.0 ] hexacosane

A. WITH POTASSIUM HYDROXIDE

A 1-liter round-bottom flask was charged, while agitated, with 250 ml. of anhydrous methanol, 10 g. (0.15 gram-mole) of 85 percent potassium hydroxide, and 49.6 g. (0.133 gram-mole) of 2,5,8,15,18,21-hexaoxatricyclo [20.4.0.0 ] hexacosane. Heat was evolved. After everything appeared to be in solution, the flask was attached to a rotary evaporator and volatiles were removed at 40 C. (0.5 mm. Hg). The residue, 63.0 g., was taken up in 650 ml. of benzene and filtered through fine paper. The filtrate was a clear pale yellow solution which was 0.156 normal in alkalinity (equivalent to 8.74 g. KOH per l. or 1% KOH by weight). The yield of the complex based on the starting polyether was 75 percent.

WITH POTASSIUM IODIDE

A 2.0-gram portion (0.0121 gram-mole) of potassium iodide was added to an agitated solution of 4.5 grams (0.0121 gram-mole) of 2,5,8,15,18,21-hexaoxatricyclo [20.4.0.0 ] hexacosane in 100 milliliters of methanol at 25 C. Concentration of the clear, faintly yellow solution, which resulted, gave 6.7 grams of residue. This material was taken up in 150 milliliters of benzene and filtered through fine paper. Concentration of the filtrate in a vacuum rotary evaporator gave 6.1 grams of white solid. Recrystallization of this material from warm benzene gave 5.5 grams of white, free-flowing powder. Analysis. Calculated: percent carbon, 44.6; percent hydrogen, 6.7; percent iodine, 23.6. Found: percent carbon, 45.4, 44.5; percent hydrogen, 6.6, 6.8; percent iodine, 23.0. The solubility in benzene was equivalent to 1.35 per cent by weight of potassium iodine at 26 C.

C. WITH POTASSIUM TRIIODIDE

A potassium triiodide complex was prepared by mixing 150 ml. of methanol, 0.212 g. (0.00085 gram-mole) of iodine, and 0.458 g. (0.00085 gram-mole) of the potassium iodide crowned complex prepared in part B above, and subsequently removing the solvent under vacuum in a rotary evaporator. The complex was a dark brown solid very soluble in methylene chloride, chloroform and ethylene chloride; soluble in o-dichlorobenzene and tetrahydrofuran; poorly soluble in carbon tetrachloride. Analysis. Calculated for C H O I K; percent carbon, 30.3; percent hydrogen, 4.6; percent iodine, 48.1. Found: percent carbon, 29.9, percent hydrogen, 4.5, 4.6; percent iodine, 47.9.

D. WITH AMMONIUM THIOCYANATE

A 3.72-gram (0.01 gram-mole) portion of 2,5,8,15,18,21-hexaoxatricyclo[20.4.0.0 ] hexacosane and 0.76 gram (0.01 gram-mole) of ammonium thiocyanate were mixed at 26 C. in 8 milliliters of methanol. After the temperature had risen to 31 C. and the solids had dissolved completely, 17 milliliters of methanol and 0.1 gram of Darco black were added and the mixture filtered. Concentration of the filtrate under vacuum in a rotary evaporator left a very viscous resin weighing 4.4 grams [Theoretical yield: 4.48 grams]. Analysis. Calculated: percent carbon, 56.3; percent hydrogen 8.9; percent nitrogen, 6.3; percent sulfur, 7.1. Found percent carbon, 55.1; percent hydrogen, 8.9; percent nitrogen, 6.14; percent sulfur 7.1. After the viscous resin had crystallized, the melting point of the complex was obtained (107 –110 C.).

EXAMPLE 18

Complexes of 2,5,8,11,14,17-hexaoxabicyclo [16.4.0]-docosane: $C_{16}H_{30}O_6$

A. WITH AMMONIUM THIOCYANATE 1.481 gms. (0.0047 mole) of 2,5,8,11,14,17-hexaoxabicyclo [16.4.0] docosane is mixed with 0.354 gm. (0.0047 mole) of ammonium thiocyanate in 15 ml. of methanol and allowed to evaporate at room temperature (26° C.). The compounds formed a white solid complex melting in the range 124° to 147° C.

| Found for Product | | Calculated for $C_{17}H_{34}N_2O_6S$ |
|---|---|---|
| C:% | 51.4 | 51.8 |
| H:% | 8.6 | 8.6 |
| N:% | 7.0 | 7.1 |
| S:% | 8.4 | 8.1 |

B. WITH BARIUM THIOCYANATE

Using the same procedure as in Part A above 1.00 gm. (0.004 mole) of $Ba(SCN)_2$ is made into a complex by reaction with 1.261 gm. (0.004 mole) of 2,5,8,11,14,17-hexaoxabicyclo [16.4.0] docosane. The white solid complex melts at 282.5° C. leaving a solid residue.

| Found for Product | | Calculated for $C_{18}H_{30}N_2O_6S_2Ba$ |
|---|---|---|
| C:% | 37.6 | 37.8 |
| H:% | 5.3 | 5.3 |
| N:% | 4.3 | 4.9 |

EXAMPLE 19

Formation of Crowned Complexes in Solution

In each case a solid crystal of the inorganic salt was added to a very dilute solution of the macrocyclic compound in reagent grade methanol at room temperature in a silica glass spectrophotometric cell having a path length of 1 centimeter. The formation of complexes in solution was shown by the Ultraviolet Spectra which showed pronounced changes in absorption compared with spectra of the ring compounds alone. Complex formation was demonstrated in the following cases:

A. 2,3,9,10-dibenzo-1,4,8,11-tetraoxacyclotetradeca-2,9-diene, $2 \times 10^{-4}$ Molar, with LiBr and NaBr.

B. 2,3,9,10-dibenzo-1,4,8,11,14-pentaoxacyclohexadeca-2,9-diene, $2.24 \times 10^{-4}$ Molar, with NaBr.

C. 2,3,8,9-dibenzo-1,4,7,10,13,16-hexaoxacyclotadeca-2,8-diene, $2.06 \times 10^{-4}$ Molar, with NaBr, KBr, CsF, $SrCl_2$, $BaCl_2$.

D. 2,3,11,12-dibenzo-1,4,7,10,13,16-hexaoxacyclotadeca-2,11-diene, $1.86 \times 10^{-4}$ Molar, with $NH_4CNS$, LiBr, NaBr, KBr, CsF, $AgNO_3$, $CaCl_2$, $SrCl_2$, $BaCl_2$, $BaCl_2$, $HgCl_2$, $La(CH_3COO)_3$, $CeF_3$.

E. 2,3,14,15-dibenzo-1,4,7,10,13,16,19,22-octaoxacyclotetracosa-2,14-diene, $2.1 \times 10^{-4}$ Molar with $BaCl_2$.

F. 2,3,9,10-bis(tert-butyl benzo)-1,4,8,11-tetraoxacyclotetradeca-2,9-diene, $2.3 \times 10^{-4}$ Molar, with LiBr and NaBr.

G. 2,3,11,12-bis(tert-butyl benzo)-1,4,7,10,13,16-hexaoxacyclooctadeca-2,11-diene, $1.75 \times 10^{-4}$ Molar with LiBr, NaBr, KBr, CsF, $CaCl_2$, $SrCl_2$, $BaCl_2$.

H. 2,3-benzo-1,4,7,10,13,16-hexaoxacyclooctadeca-2-ene, $4.74 \times 10^{-4}$ Molar, with NaBr, KBr, CsF, $CaCl_2$, $SrCl_2$ and $BaCl_2$.

I. 2,3,8,9,14,15-tribenzo-1,4,7,10,13,16-hexaoxacyclooctadeca-2,8,14-triene, $1.67 \times 10^{-4}$ Molar, with NaBr, KBr, $CaCl_2$.

J. 2,3,8,9,14,15-tribenzo-1,4,7,10,13,16-hexaoxacyclononadeca-2,8,14-triene, $1.75 \times 10^{-4}$ Molar, with KBr.

K. 2,3,11,12-dibenzo-1,4,7,10,13,16,19-hexaoxacycloheneicosa-2,11-diene, $1.78 \times 10^{-4}$ Molar, with CsF and $BaCl_2$.

L. 2,3,8,9,14,15,20,21-tetrabenzo-1,4,7,10,13,16,19,22-octaoxacyclotetracosa-2,8,14,20-tetraene $1.18 \times 10^{-4}$ Molar, with CsF and $BaCl_2$.

EXAMPLE 20

Preparation of Crystalline Crowned Complexes

A. A 250-ml. beaker was charged with 3.6 g. (0.01 gram-mole) of 2,3,11,12-dibenzo-1,4,7,10,13,16-hexaoxacyclooctadeca-2,11-diene, 1 g. (0.0123 gram-mole) of NaCNS, 50 ml. of n-butanol and 100 ml. of methanol. The contents were then warmed on a steambath and concentrated to 70 ml. The resulting clear solution was allowed to cool to room temperature, and the resulting crystals were filtered, washed with methanol and dried in a vacuum oven at 40° C. White crystals weighing 2.6 g. were obtained. Yield: 63 percent. Some more product was recovered from the filtrate by concentration: 1.4 g. Yield: 34 percent.

| Found for Product | | Calculated for $C_{21}H_{24}NO_6SNa$ |
|---|---|---|
| C:% | 57.1 | 57.2 |
| H:% | 5.7 | 5.4 |
| N:% | 4.0 | 3.2 |
| S:% | 7.1 | 7.3 |

Melting point: 230–2°C.
Ultraviolet spectrum:
    Methanol 273 mu ←= 5,500
    279 mu ←= 4,800

B. A 250-ml. beaker was charged with 2.5 g. (0.0069 gram-mole) of 2,3,11,12-dibenzo-1,4,7,10,13,16-hexaoxacyclooctadeca-2,11-diene, 2.65 g. (0.007 gram-mole) of lead acetate trihydrate and 100 ml. of n-butanol. The mixture was then warmed on the steambath for 30 minutes while being periodically stirred. The crystals which resulted when it was cooled to room temperature, were filtered, washed with n-butanol and dried in a vacuum oven at 40° C. Four and a half grams of white powder were obtained. Yield: 95 percent.

| Found for Product | | Calculated for $C_{24}H_{30}O_{10}Pb$ |
|---|---|---|
| C:% | 42.3 | 42.0 |
| H:% | 4.4 | 4.4 |
| Pb:% | 28.9 | 30.2 |

Melting range: 167–198°C.

C. A 250-ml. beaker, charged with 4.33 grams (0.012 gram-mole) of 2,3,11,12-dibenzo- 1,4,7,10,13,16-hexaoxacyclooctadeca-2,11-diene, 0.9 gram (0.013 gram-mole) of NaNO₃, and 100 ml. of n-butanol, was warmed on a steambath until a clear solution resulted. On being cooled to room temperature, it deposited white crystals of 2,3,11,12-dibenzo-1,4,7,10,13,16-hexaoxacyclooctadeca-2,11-diene; evaporation of the solvent from the yellow filtrate gave 1.73 grams of a very pale yellow crowned 1:1 molecular complex weighing 1.73 grams, melting 154°–7° C. and analyzing as follows:

| | Found for Product | Calculated for C₂₀H₂₄O₆·NaNO₃ |
|---|---|---|
| C:% | 55.9 | 55.5 |
| H:% | 5.6 | 5.7 |
| N:% | 3.3 | 3.2 |

D. A solution of 2.36 g. (0.005 gram-mole) of 2,3,11,12-bis(tert-butyl benzo)-1,4,7,10,13,16-hexaoxacyclooctadeca-2,11-diene in 100 ml. of methanol containing 0.56 g. (0.0086 gram-mole) of 86% KOH was evaporated to dryness with an efficient vacuum pump. When the residue obtained had been warmed with 170 ml. of dry benzene and filtered through coarse paper, the resulting solution was found to be 0.0193 normal in alkalinity (by titrating with standardized hydrochloric acid to phenolthalein end-point). According to this, 66 percent of 2,3,11,12-bis(tert-butylbenzo)-1,4,7,10,13,16-hexaoxacyclooctadeca-2,11-diene had formed a complex with KOH.

Control experiments, with and without methanol, showed that KOH is not soluble in benzene.

The crowned complex of 2,3,11,12-bis(tert-butylbenzo)1,4,7,10,13,16-hexaoxacyclooctadeca-2,11-diene with potassium pivalate was made by mixing the following compounds and concentrating the resulting clear solution to dryness while rotated under vacuum:

| | |
|---|---|
| 2,3,11,12-bis(tert-butylbenzo)-1,4,7,10,13,16-hexaoxacyclooctadeca-2,11-diene | 4.72 grams (0.01 gram-mole |
| KOH | 1.47 grams (0.0105 gram-mole) |
| Methanol | 100 milliliters |

The friable residue obtained was dissolved in 75 ml. benzene, passed through decolorizing charcoal, and concentrated to dryness while rotated under vacuum. The crowned complex was a friable white solid weighing 5 grams, melting at 82°–92° C., and analyzing as follows:

| | Found for Product | Calculated for C₃₃H₄₉O₈K |
|---|---|---|
| C:% | 64.5, 64.5 | 64.7 |
| H:% | 7.8, 8.0 | 8.0 |
| Molecular Weight | 605 | 612 |

The crowned complex of 2,3,11,12-bis(tert-butyl benzo)-1,4,7,10,13,16-hexaoxacyclooctadeca-2,11-diene with potassium permanganate was made by mixing the following compounds and concentrating the resulting solution to dryness while rotated under vacuum (at 25° C.):

| | |
|---|---|
| Crown Compound | 1 gram (0.00212 gram-mole) |
| KMnO₄ | 0.335 gram (0.00212 gram-mole) |
| Acetone | 100 milliliters |

The dark purple residue was mixed with 54 milliliters of benzene; brown solid MnO₂ was filtered off. The dark purple filtrate containing 1:1 Molecular Complex deposited the latter as a mauve powder when mixed with cyclohexane.

KMnO₄ is not soluble in benzene.

I claim:

1. A macrocyclic polyether having a macrocyclic ring of carbon and oxygen atoms totaling 14–60 ring atoms, each oxygen in the ring being separated from its adjoining oxygens in the ring by two or three carbon atoms; and the macrocyclic ring being fused by a pair of vicinal carbon atoms to 1–4 carbocyclic rings of the group:

a. phenylene, naphthylene, phenanthrylene, and anthrylene,
   b. saturated analogs of (a), and
   c. substituted derivatives of (a) and (b) wherein the substituents are from the group of chloro, bromo, iodo, nitro, amino, alkyl, aryl, aralkyl, alkoxy, cyano, hydroxy, carboxy, and sulfo wherein alkyl and alkylene radicals contain one to eight carbon atoms and any aryl radical contains less than 11 carbon atoms.

2. The polyether of claim 1 wherein the macrocyclic ring contains 14–28 atoms.

3. The polyether of claim 2 wherein the macrocyclic ring contains at least five oxygen atoms.

4. The polyether of claim 2 wherein the 1–4 rings to which the macrocyclic ring is fused are single rings.

5. The polyether of claim 4 wherein the macrocyclic ring is fused to 1–4 rings from the group: phenylene and cyclohexylene.

6. A polyether of claim 1 having the formula

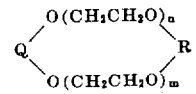

wherein Q is (a), (b) or (c) and R is (a), (b), (c) or —CH₂CH₂—; with the provisos that (m + n) is 3–8 when R is —CH₂CH₂— and m is 2–9 and n is 1–9 when R is (a), (b) or (c).

7. The polyether of claim 6 wherein Q and R are

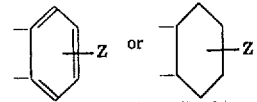

and Z is from the group: hydrogen, chloro, bromo, iodo, nitro, amino, alkyl, aryl, aralkyl, alkoxy, cyano, hydroxy, carboxy or sulfo wherein alkyl and alkylene radicals contain 1–8 carbon atoms and any aryl radical contains less than 11 carbon atoms.

8. A polyether of claim 7 wherein Z is hydrogen.

9. A polyether of claim 1 having the formula

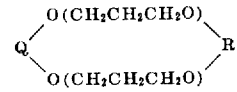

where Q is (a), (b) or (c) and R is (a), (b), (c) or —CH$_2$CH$_2$—.

10. The polyether of claim 9 wherein Q and R are

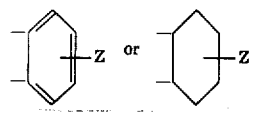

and Z is from the group: hydrogen, chloro, bromo, iodo, nitro, amino, alkyl, aryl, aralkyl, alkoxy, cyano, hydroxy, carboxy or sulfo wherein alkyl and alkylene radicals contain 1–8 carbon atoms and any aryl radical contains less than 11 carbon atoms.

11. The polyether of claim 10 wherein Z is hydrogen.

12. A macrocyclic polyether of claim 1 wherein a carbocyclic ring bears a substituent from the group chloro, bromo, iodo, nitro, amino, alkyl, aryl, aralkyl, alkoxy, cyano, hydroxy, carboxy, and sulfo wherein alkyl and alkylene radicals contain one to eight carbon atoms and any aryl radical contains less than 11 carbon atoms.

13. A macrocyclic polyether of claim 1 wherein the carbocyclic rings are selected from at least one of the groups (a) and (b).

* * * * *